(12) United States Patent
Ogura et al.

(10) Patent No.: US 10,154,340 B2
(45) Date of Patent: Dec. 11, 2018

(54) MICROPHONE

(71) Applicant: Panasonic Intellectual Property Management Co., Ltd., Osaka (JP)

(72) Inventors: Hiroshi Ogura, Tokyo (JP); Kazumoto Doi, Kanagawa (JP); Futoshi Takeshi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/099,252

(22) Filed: Apr. 14, 2016

(65) Prior Publication Data

US 2016/0234594 A1  Aug. 11, 2016

Related U.S. Application Data

(63) Continuation of application No. PCT/JP2014/005218, filed on Oct. 15, 2014.

(30) Foreign Application Priority Data

Oct. 15, 2013  (JP) .................................. 2013-214563
Jan. 9, 2014  (JP) .................................. 2014-002658

(51) Int. Cl.
*H04R 1/44* (2006.01)
*B60R 11/02* (2006.01)
(Continued)

(52) U.S. Cl.
CPC ............ *H04R 1/44* (2013.01); *B60R 11/0247* (2013.01); *B60R 16/0373* (2013.01);
(Continued)

(58) Field of Classification Search
CPC . H04R 1/44; H04R 1/46; H04R 1/406; H04R 1/086; H04R 1/021; H04R 1/04;
(Continued)

(56) References Cited

U.S. PATENT DOCUMENTS 3,881,056 A     4/1975  Gibson et al.
4,856,072 A  *  8/1989  Schneider ........... B60R 16/0373
                                                        180/289
(Continued)

FOREIGN PATENT DOCUMENTS

CN           201378860 Y      1/2010
DE             3046627 A1     7/1982
(Continued)

OTHER PUBLICATIONS

International Search Report issued in Application No. PCT/JP2014/005218 dated Jan. 20, 2015, with English translation.

(Continued)

*Primary Examiner* — Jason R Kurr
(74) *Attorney, Agent, or Firm* — Greenblum & Bernstein, P.L.C.

(57) ABSTRACT

A microphone structure has a diaphragm; a frame of which an inside is processed in a shape of a semispherical surface, a parabolic surface, or a conical surface; an acoustic transducer that converts sound pressure into an electric signal; and a wire that transmits the electric signal from the acoustic transducer to outside. A sound pressure input surface of the acoustic transducer is disposed on a bottom surface portion of the semispherical surface, the parabolic surface, or the conical surface inside the frame. The diaphragm and the frame, and the frame and the wire include waterproof mechanisms preventing ingress of water.

13 Claims, 20 Drawing Sheets

(51) Int. Cl.
*H04R 1/08* (2006.01)
*E05F 15/70* (2015.01)
*B60R 16/037* (2006.01)
*G10L 17/24* (2013.01)
*H04R 1/04* (2006.01)
*H04R 1/02* (2006.01)
*H04R 1/40* (2006.01)
*H04R 1/46* (2006.01)
*H04R 3/00* (2006.01)
*H04R 19/00* (2006.01)
*G10L 15/22* (2006.01)

(52) U.S. Cl.
CPC .............. *E05F 15/70* (2015.01); *G10L 17/24* (2013.01); *H04R 1/086* (2013.01); *G10L 2015/223* (2013.01); *H04R 1/021* (2013.01); *H04R 1/04* (2013.01); *H04R 1/406* (2013.01); *H04R 1/46* (2013.01); *H04R 3/005* (2013.01); *H04R 19/005* (2013.01); *H04R 2201/003* (2013.01); *H04R 2201/403* (2013.01); *H04R 2499/13* (2013.01)

(58) Field of Classification Search
CPC .................. H04R 3/005; H04R 19/005; H04R 2201/003; H04R 2201/403; H04R 2499/13; B60R 11/0247; B60R 16/0373; G10L 17/24; G10L 2015/223; E05F 15/70
USPC ........................................................ 381/355
See application file for complete search history.

(56) References Cited

U.S. PATENT DOCUMENTS

| | | | |
|---|---|---|---|
| 6,671,672 B1 * | 12/2003 | Heck ........................ | G10L 17/24 704/273 |
| 6,702,061 B2 * | 3/2004 | Vanderveen ....... | G10K 11/1788 181/205 |
| 6,771,788 B1 | 8/2004 | Soutar et al. | |
| 7,778,430 B2 | 8/2010 | Nakajima et al. | |
| 8,077,022 B2 * | 12/2011 | Baruco ................. | B60R 25/257 340/426.13 |
| 8,873,783 B2 * | 10/2014 | Koester ................ | H04R 25/608 381/189 |
| 2004/0117274 A1 | 6/2004 | Cenedese et al. | |
| 2005/0244020 A1 | 11/2005 | Nakajima et al. | |
| 2006/0140432 A1 * | 6/2006 | Ueki ....................... | H04R 1/086 381/369 |
| 2007/0113964 A1 * | 5/2007 | Crawford ............... | H04R 1/086 156/249 |
| 2007/0127759 A1 | 6/2007 | Zhang et al. | |
| 2008/0229840 A1 | 9/2008 | Shirasaka et al. | |
| 2008/0279407 A1 * | 11/2008 | Pahl ....................... | B81B 7/0064 381/355 |
| 2009/0175478 A1 | 7/2009 | Nakajima et al. | |
| 2009/0309713 A1 | 12/2009 | Baruco et al. | |
| 2011/0013799 A1 * | 1/2011 | Fang ....................... | H04R 1/086 381/355 |
| 2013/0188794 A1 * | 7/2013 | Kawamata .............. | G01S 3/803 381/56 |

FOREIGN PATENT DOCUMENTS

| | | |
|---|---|---|
| GB | 2064263 A | 6/1981 |
| JP | 57-67478 | 10/1980 |
| JP | 61-048210 A | 3/1986 |
| JP | 62-251256 A | 11/1987 |
| JP | 62-193391 U | 12/1987 |
| JP | 62-196495 U | 12/1987 |
| JP | 63-018289 A | 1/1988 |
| JP | 2-111987 | 9/1990 |
| JP | H03-149669 A | 6/1991 |
| JP | 05-018188 U | 3/1993 |
| JP | H06-098387 A | 4/1994 |
| JP | 2002-044772 A | 2/2002 |
| JP | 2002-125286 A | 4/2002 |
| JP | 2004-526116 A | 8/2004 |
| JP | 2004-320327 A | 11/2004 |
| JP | 2004-328231 A | 11/2004 |
| JP | 3760173 B2 | 3/2006 |
| JP | 2006-148739 | 6/2006 |
| JP | 2006-276605 A | 10/2006 |
| JP | 2007-116620 A | 5/2007 |
| JP | 2007-308887 A | 11/2007 |
| JP | 2008-062885 A | 3/2008 |
| JP | 2008-167130 A | 7/2008 |
| JP | 2008-227482 A | 9/2008 |
| JP | 2011-023786 A | 2/2011 |
| JP | 4671290 B2 | 4/2011 |
| JP | 4702795 B2 | 6/2011 |
| JP | 2011-232293 A | 11/2011 |
| JP | 5203899 B2 | 6/2013 |
| WO | 2006/128956 A1 | 12/2006 |
| WO | 2011/136234 A1 | 11/2011 |

OTHER PUBLICATIONS

European Office Action issued in Application No. 14854076.8 dated Sep. 16, 2016.
Extended European Search Report issued in Application No. 14854076.8 dated Dec. 20, 2016.
Chinese Office Action for CN App. No. 201480056522.1 dated Aug. 15, 2017, along with English-language translation thereof.
Japanese Office Action for JP App. No. 2015-542521 dated Apr. 3, 2018, along with English-language translation thereof.

* cited by examiner

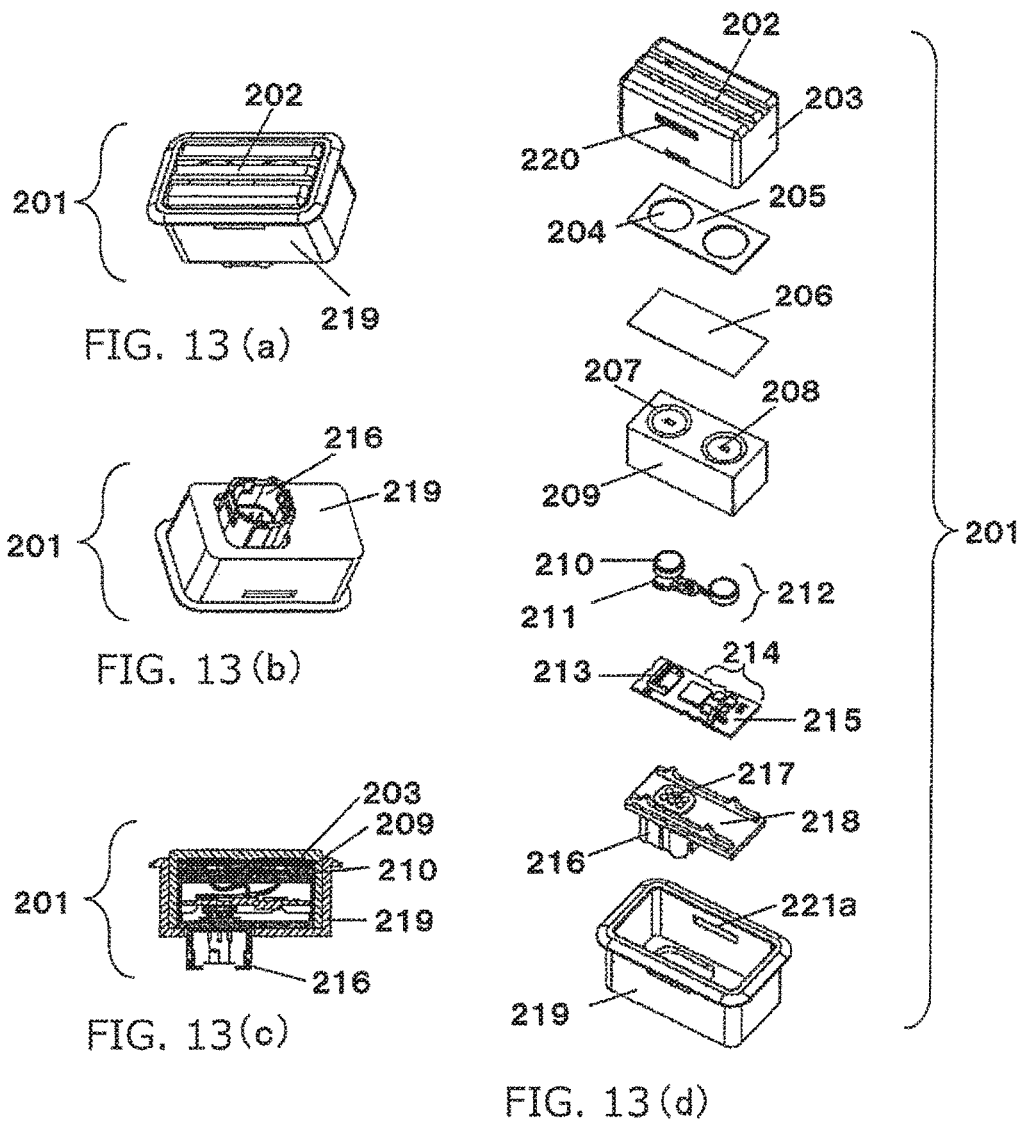

MICROPHONE

CROSS REFERENCE TO RELATED APPLICATIONS

This application is a continuation of PCT application No. PCT/JP14/005218, which was filed on Oct. 15, 2014 based on Japanese Patent Application (No. P2013-214563) filed on Oct. 15, 2013 and Japanese Patent Application (No. P2014-002658) filed on Jan. 9, 2014, the contents of which are incorporated herein by reference.

BACKGROUND OF THE INVENTION

1. Field of the Invention

One or more embodiments of the present invention relate to a microphone disposed outside or inside a vehicle cabin, and particularly, to the structure of a waterproof microphone configured to prevent ingress of water or rubbish.

2. Description of the Related Art

As an use of a microphone installed outside a vehicle cabin, for example, PTL 1 discloses an example of a device in which a plurality of microphones are disposed outside a vehicle cabin to detect a travelling sound of another vehicle and a sound source direction of the another vehicle is estimated.

As a use of a microphone installed outside another vehicle cabin, for example, PTL 2 discloses an example of a vehicle voice recognition device that operates an in-vehicle control device through voice recognition using a contact type microphone (referred to as an NAM microphone) which is brought into contact with a human body and collects a voice spoken by a person. The structure of the NAM microphone of PTL 2 is disclosed in, for example, PTL 3, PTL 4, PTL 5, and PTL 6. As the related art, there is PTL 7 disclosing a timepiece microphone rather than a microphone for a vehicle use.

PTL 1 is Pamphlet of International Publication No. WO 2011/136234. PTL 2 is JP-A-2006-276605. PTL 3 is Japanese Patent No. 3760173. PTL4 is Japanese Patent No. 4671290. PTL 5 is Japanese Patent No. 4702795. PTL 6 is Japanese Patent No. 5203899. PTL 7 is JP-A-63-18289.

SUMMARY OF THE INVENTION

In the technologies of the related art, however, there is a problem in that the structures of microphones against ingress of water, rubbish, or dust have not be examined when the microphone is disposed outside a vehicle cabin. In a case in which a microphone is actually disposed outside a vehicle cabin, there is a problem in environmental resistance of the microphones.

One or more embodiments of the invention are devised in view of the foregoing and an object of the embodiments is to provide a microphone capable of improving environmental resistance even in a case in which the microphone is disposed outside a vehicle cabin.

According to an aspect of the embodiments, there is provided a microphone that is disposed in a vehicle and includes: a diaphragm; a frame of which an inside is processed in a shape of a semispherical surface, a parabolic surface, or a conical surface; an acoustic transducer that converts sound pressure into an electric signal; and a wire that transmits the electric signal from the acoustic transducer to outside. A sound pressure input surface of the acoustic transducer is disposed on a bottom surface portion of the semispherical surface, the parabolic surface, or the conical surface inside the frame. The diaphragm and the frame, and the frame and the wire include waterproof mechanisms preventing ingress of water.

In the foregoing configuration, the acoustic transducer converting the sound pressure into the electric signal is not exposed to the outside, and the diaphragm and the frame, and the frame and the wire have the waterproof mechanisms preventing the ingress of water. Therefore, it is possible to prevent attachment of water, rubbish, or dust to the acoustic transducer. Thus, even in a case in which the microphone is disposed outside the cabin, it is possible to provide the microphone in which the acoustic transducer is not broken down and environmental resistance is improved.

According to another aspect of the embodiments, there is provided a microphone that is disposed in a vehicle and includes: a diaphragm; a frame of which an inside is processed in a shape of a semispherical surface, a parabolic surface, or a conical surface; an acoustic transducer that converts sound pressure into an electric signal; and a wire that transmits the electric signal from the acoustic transducer to outside. A sound pressure input surface of the acoustic transducer is disposed to be opposite to a bottom surface portion of the semispherical surface, the parabolic surface, or the conical surface inside the frame. The diaphragm and the frame, and the frame and the wire include waterproof mechanisms preventing ingress of water.

In the foregoing configuration, the sound pressure input surface of the acoustic transducer is disposed to be opposite to the bottom surface portion of the semispherical surface, the parabolic surface, or the conical surface inside the frame in addition to the microphone for which the environmental resistance is improved. Therefore, since weak sound pressure can be collected and input to the acoustic transducer as in a parabolic antenna of radio waves, there is the effect in which a distant voice is collected.

In the microphone according to the aspect of the embodiments, in the diaphragm and the frame, and the frame and the wire, resins may be coated as the waterproof mechanisms preventing the ingress of the water.

In the foregoing configuration, the resins are coated as the waterproof mechanisms, so that inexpensive means can be realized as the waterproof mechanisms of the microphone.

In the microphone according to the aspect of the embodiments, an O ring may be disposed as the waterproof mechanism preventing the ingress of the water between the diaphragm and the frame.

In the foregoing configuration, by disposing the O ring as the waterproof mechanism, the connection between the diaphragm and the frame can be opened several times. Thus, even when the acoustic transducer is electrically broken down, it is possible to handle the breakdown of the acoustic transducer.

In the microphone according to the aspect of the embodiments, a packing may be disposed to be inserted between the diaphragm and the frame as the waterproof mechanism preventing the ingress of the water between the diaphragm and the frame.

In the foregoing configuration, by disposing the packing as the waterproof mechanism, the connection between the diaphragm and the frame can be opened several times. Further, there is the effect in which the outer dimensions of the microphone can be miniaturized further than the case in which the O ring is used.

According to still another aspect of the embodiments, there is provided a microphone that is disposed in a vehicle and includes: a diaphragm; a frame of which an inside is processed in a shape of a semispherical surface, a parabolic surface, or a conical surface and in which a partition wall is disposed; a plurality of acoustic transducers that convert sound pressure into electric signals; and a plurality of wires that transmit the electric signals from the plurality of acoustic transducers to outside. Sound pressure input surfaces of the plurality of acoustic transducers are disposed on a bottom surface portion of the semispherical surface, the parabolic surface, or the conical surface inside the frame with the partition wall inside the frame interposed therebetween. The diaphragm and the frame, and the frame and the plurality of wires include waterproof mechanisms preventing ingress of water.

In the foregoing configuration, since the sound pressure input surface of the acoustic transducer is disposed independently for each partition wall of the frame, the acoustic transducer can independently sense the sound pressure. When a sound synthesis process such as noise suppression is performed, it is possible to independently control the phase of sound pressure.

According to still another aspect of the embodiments, there is provided a microphone that is disposed in a vehicle and includes: a plurality of diaphragms; a frame of which an inside is processed in a shape of a plurality of semispherical surfaces, parabolic surfaces, or conical surfaces; a plurality of acoustic transducers that convert sound pressure into electric signals; and wires that transmit the electric signals from the plurality of acoustic transducers to outside. Sound pressure input surfaces of the plurality of acoustic transducers are disposed on bottom surface portions of the semispherical surfaces, the parabolic surfaces, or the conical surfaces inside the frame. The diaphragm and the frame, and the frame and the wires include waterproof mechanisms preventing ingress of water.

In the foregoing configuration, since the sound pressure input surface of the acoustic transducer is independently disposed for each partition wall of the frame, the acoustic transducer can independently sense the sound pressure. When the sound combining process such as noise suppression is performed, it is possible to independently control the phase of the sound pressure.

According to still another aspect of the embodiments, there is provided a vehicle trunk opening and closing system including: a microphone that collects a voice spoken by a talker; a voice recognition device that uses a pre-decided specific spoken voice as a voice key; a signal processor that outputs an instruction signal to open or close a trunk of a vehicle according to information from the voice recognition device; and a mechanism that mechanically opens or closes the trunk of the vehicle. The microphone according to the aspect of the embodiments is used as the microphone.

In the foregoing configuration, since the microphone according to the aspect of the embodiments can be used, it is possible to provide the vehicle trunk opening and closing system with high environmental resistance.

According to still another aspect of the embodiments, there is provided a vehicle door opening and closing system including: a microphone that collects a voice spoken by a talker; a voice recognition device that uses a pre-decided specific spoken voice as a voice key; a signal processor that outputs an instruction signal to open or close a door of a vehicle according to information from the voice recognition device; and a mechanism that mechanically opens or close the door of the vehicle. The microphone according to the aspect of the embodiments is used as the microphone.

In the foregoing configuration, since the microphone according to the aspect of the embodiments can be used, it is possible to provide the vehicle door opening and closing system with high environmental resistance.

According to still another aspect of the embodiments, there is provided a vehicle light illumination system including: a microphone that collects a voice spoken by a talker; a voice recognition device that uses a pre-decided specific spoken voice as a voice key; a signal processor that outputs an instruction signal to turning on or off a light of a vehicle according to information from the voice recognition device; and a mechanism that turns on or off the light of the vehicle. The microphone according to the aspect of the embodiments is used as the microphone.

In the foregoing configuration, since the microphone according to the aspect of the embodiments can be used, it is possible to provide the vehicle light illumination system with high environmental resistance.

In the vehicle trunk opening and closing system according to the aspect of the embodiments, a voice instruction to prompt a spoken voice input may be given to the talker through a speaker.

In the foregoing configuration, since a voice instruction to prompt the talker to speak is given, the talker can speak in a facing mode. Thus, the convenience of the talker is improved.

In the vehicle door opening and closing system according to the aspect of the embodiments, a voice instruction to prompt a spoken voice input may be given to the talker through a speaker.

In the foregoing configuration, since a voice instruction to prompt the talker to speak is given, the talker can speak in a facing mode. Thus, the convenience of the talker is improved.

In the vehicle light illumination system according to the aspect of the embodiments, a voice instruction to prompt a spoken voice input may be given to the talker through a speaker.

In the foregoing configuration, since a voice instruction to prompt the talker to speak is given, the talker can speak in a facing mode. Thus, the convenience of the talker is improved.

According to still another aspect of the embodiments, there is provided a sound source direction estimation device for which a plurality of microphones are disposed in an own vehicle to detect a traveling sound of another vehicle and which estimates a sound source direction of the another vehicle. The microphones disposed in the own vehicle are the microphone according to the aspect of the embodiments.

In the foregoing configuration, since the microphone according to the aspect of the embodiments is used, it is possible to provide the sound source direction estimation device of another vehicle in which the environmental resistance is high.

According to still another aspect of the embodiments, there is provided a microphone including: a frame; a first film membrane; a second film membrane; at least one acoustic transducer; and a case that holds the acoustic transducer. The first and second film membranes are disposed between a rear surface of a frame front surface portion and a front surface of a case front surface portion holding the acoustic transducer. In the case holding the acoustic transducer, a first through hole is formed on an upper portion holding the acoustic transducer, and the second film membrane is joined to a case upper portion. In the first film membrane, a second through hole is formed immediately above the acoustic transducer, and the first film membrane performs a function of an acoustic sealing member so that sound pressure does not diffuse between the second film membrane and the rear surface of the frame front surface portion. The frame front surface portion has a latticed beam.

In the foregoing configuration, even when the microphone is installed outside an automobile cabin, it is possible to protect the inside of the microphone against a flying object such as a stepping stone kicked up by a tire. It is possible to provide the microphone with high durability.

According to still another aspect of the embodiments, there is provided a microphone including: a frame; a first film membrane; a second film membrane; at least one acoustic transducer; and a case that holds the acoustic transducer. The first and second film membranes are disposed between a rear surface of a frame front surface portion and a front surface of a case front surface portion holding the acoustic transducer. In the case holding the acoustic transducer, a first through hole is formed on an upper portion holding the acoustic transducer, and the second film membrane is joined to a case upper portion. In the first film membrane, a second through hole is formed immediately above the acoustic transducer, and the first film membrane performs a function of an acoustic sealing member so that sound pressure does not diffuse between the second film membrane and the rear surface of the frame front surface portion. In the frame front surface portion, there is no through opening space in a portion immediately above the acoustic transducer and there is a through opening space in other portions.

In the foregoing configuration, even when the microphone is installed outside an automobile cabin, it is possible to protect the inside of the microphone against a flying object such as a stepping stone kicked up by a tire. It is possible to provide the microphone with high durability.

According to still another aspect of the embodiments, there is provided a microphone including: a frame; a first film membrane; a second film membrane; at least one acoustic transducer; and a case that holds the acoustic transducer. The first and second film membranes are disposed between a rear surface of a frame front surface portion and a front surface of a case front surface portion holding the acoustic transducer. In the case holding the acoustic transducer, a first through hole is formed on an upper portion holding the acoustic transducer, and the second film membrane is joined to a case upper portion. In the first film membrane, a second through hole is formed immediately above the acoustic transducer, and the first film membrane performs a function of an acoustic sealing member so that sound pressure does not diffuse between the second film membrane and the rear surface of the frame front surface portion. In the frame front surface portion, there is no through opening space in a portion immediately above a through hole opening portion and there is a through opening space in other portions.

In the foregoing configuration, even when the microphone is installed outside an automobile cabin, it is possible to protect the inside of the microphone against a flying object such as a stepping stone kicked up by a tire. It is possible to provide the microphone with high durability.

According to still another aspect of the embodiments, there is provided a microphone including: a front surface cover; a frame; a first film membrane; a second film membrane; at least one acoustic transducer; and a case that holds the acoustic transducer. The first and second film membranes are disposed between a rear surface of a frame front surface portion and a front surface of a case front surface portion holding the acoustic transducer. In the case holding the acoustic transducer, a first through hole is formed on an upper portion holding the acoustic transducer, and the second film membrane is joined to a case upper portion. In the first film membrane, a second through hole is formed immediately above the acoustic transducer, and the first film membrane performs a function of an acoustic sealing member so that sound pressure does not diffuse between the second film membrane and the rear surface of the frame front surface portion. The front surface cover is disposed on the frame front surface.

In the foregoing configuration, even when the microphone is installed outside an automobile cabin, it is possible to protect the inside of the microphone against a flying object such as a stepping stone kicked up by a tire. It is possible to provide the microphone with high durability.

In the microphone having the foregoing configuration according to the aspect of the embodiments, the front surface cover is disposed on the frame front surface and the front surface cover may be disposed to wrap the microphone.

In the foregoing configuration, it is possible to further improve the protection performance of the microphone body.

In the microphone having the foregoing configuration according to the aspect of the embodiments, the front surface cover may have a plurality of through holes.

In the foregoing configuration, it is possible to achieve suppression of wind pressure to the microphone at the time of traveling of an automobile.

In the microphone having the foregoing configuration according to the aspect of the embodiments, in the front surface of the case front surface portion holding the acoustic transducer, at least one conical counterbore may be formed in a portion including the through hole opening portion.

In the foregoing configuration, since a contact portion of a protection case for the second film membrane is not a right angle, the second film membrane is rarely torn.

According to still another aspect of the embodiments, there is provided a microphone including: a first case frame in which a beam is disposed; a first film membrane in which a first through hole is formed and which operates as an acoustic seal; a second film membrane which prevents ingress of water or dirt into an inside; an internal case which includes at least one conical counterbore and at least one second through hole; an acoustic transduction module which includes a first electric signal connection connector and at least one acoustic transducer; a circuit substrate on which a second electric signal connection connector and a plurality of electronic components are mounted; a socket which includes a connector performing electric connection to outside of the microphone; and a second case frame. A shape of the beam of the first case frame is a lattice shape.

In the foregoing configuration, even when the microphone is installed outside an automobile cabin, it is possible to protect the inside of the microphone against a flying object such as a stepping stone kicked up by a tire. It is possible to provide the microphone with high durability.

According to still another aspect of the embodiments, there is provided a microphone including: a first case frame in which a beam is disposed; a first film membrane in which a first through hole is formed and which operates as an acoustic seal; a second film membrane which prevents ingress of water or dirt into an inside; an internal case which includes at least one conical counterbore and at least one second through hole; an acoustic transduction module which includes a first electric signal connection connector and at least one acoustic transducer; a circuit substrate on which a second electric signal connection connector and a plurality of electronic components are mounted; a socket which includes a connector performing electric connection to outside of the microphone; and a second case frame. In a portion of the beam of the first case, there is no through opening space in a portion immediately above at least the one conical counterbore.

In the foregoing configuration, even when the microphone is installed outside an automobile cabin, it is possible to protect the inside of the microphone against a flying object such as a stepping stone kicked up by a tire. It is possible to provide the microphone with high durability.

In the microphone having the foregoing configuration according to the aspect of the embodiments, the second film membrane may be elastically deformed when the second film membrane receives hydraulic pressure.

In the foregoing configuration, the hydraulic pressure against the second film membrane can diffuse, and it is possible to prevent the second film membrane from being born.

In the microphone having the foregoing configuration according to the aspect of the embodiments, the second film membrane may be a porous material which has a plurality of minute through holes.

In the foregoing configuration, a frequency bandwidth in which the sound pressure of the microphone can be detected can spread compared to a case in which a film membrane with no holes is used.

In the microphone having the foregoing configuration according to the aspect of the embodiments, in the frame or a frame of the case, a drainage drain may be disposed.

In the foregoing configuration, even when water infiltrates into the frame case, it is possible to drain the infiltrating water to the outside of the frame case.

In the microphone having the foregoing configuration according to the aspect of the embodiments, the microphone may have a waterproof structure preventing ingress of water into an inside of the microphone.

In the foregoing configuration, since water does not infiltrate into the inside of the microphone, it is possible to improve the durability of the microphone.

According to still another aspect of the embodiments, there is provided a microphone unit. A microphone in which a case frame has a waterproof structure is contained. An input hole of sound pressure is formed in a part of the case frame. The input hole of the sound pressure in the case frame is a mesh-shaped ventilation portion. A drainage drain is included in a lower portion of the case frame. An angle formed by a direction in which a sound is input to the microphone unit and a direction in which a sound is input to the microphone is 90°.

In the foregoing configuration, even when a device on which the microphone unit is mounted is washed by high-pressure water of a high-pressure washer, it is possible to protect the microphone from damage.

According to still another aspect of the embodiments, there is provided a microphone unit. A microphone in which a case frame has a waterproof structure is contained. An input hole of sound pressure is formed in a lower portion of the case frame. The input hole of the sound pressure in the case frame is a mesh-shaped ventilation portion. The input hole of the sound pressure in the lower portion of the case frame also functions as a drainage drain. An angle formed by a direction in which a sound is input to the microphone unit and a direction in which a sound is input to the microphone is greater than 90° and less than 160°.

In the foregoing configuration, even when a device on which the microphone unit is mounted is washed by high-pressure water of a high-pressure washer, it is possible to protect the microphone from damage.

According to still another aspect of the embodiments, there is provided a microphone unit on which one of the foregoing microphones is mounted. A microphone in which a case frame has a waterproof structure is contained. An input hole of sound pressure is formed in a part of the case frame. The input hole of the sound pressure in the case frame is a mesh-shaped ventilation portion. A drainage drain is included in a lower portion of the case frame. An angle formed by a direction in which a sound is input to the microphone unit and a direction in which a sound is input to the microphone is 90°.

In the foregoing configuration, even when a device on which the microphone unit is mounted is washed by high-pressure water of a high-pressure washer, it is possible to protect the microphone from damage and it is possible to provide the microphone with a high durability performance.

According to still another aspect of the embodiments, there is provided a microphone unit on which one of the foregoing microphones is mounted. A microphone in which a case frame has a waterproof structure is contained. An input hole of sound pressure is formed in a lower portion of the case frame. The input hole of the sound pressure in the case frame is a mesh-shaped ventilation portion. The input hole of the sound pressure in the lower portion of the case frame also functions as a drainage drain. An angle formed by a direction in which a sound is input to the microphone unit and a direction in which a sound is input to the microphone is greater than 90° and less than 160°.

In the foregoing configuration, even when a device on which the microphone unit is mounted is washed by high-pressure water of a high-pressure washer, it is possible to protect the microphone from damage and it is possible to provide the microphone with a high durability performance.

According to still another aspect of the embodiments, there is provided an underwater microphone used underwater. The underwater microphone is a form of one of the foregoing microphones and microphone units.

In the foregoing configuration, it is possible to provide the underwater microphone with high durability.

According to still another aspect of the embodiments, there is provided an automobile on which one of the foregoing microphones and microphone units is mounted.

In the foregoing configuration, even when an automobile is washed with high-pressure water using a high-pressure washer, it is possible to provide the automobile in which the microphone or the microphone unit is not damaged.

According to still another aspect of the embodiments, there is provided an interphone on which one of the foregoing microphones and microphone units is mounted.

In the foregoing configuration, even when an interphone is washed with high-pressure water using a high-pressure washer, it is possible to provide the interphone in which the microphone or the microphone unit is not damaged.

According to still another aspect of the embodiments, there is provided a kitchen device on which one of the foregoing microphones and microphone units is mounted.

In the foregoing configuration, even when a kitchen device is washed with high-pressure water using a high-pressure washer, it is possible to provide the kitchen device in which the microphone or the microphone unit is not damaged.

According to the embodiments, it is possible to provide the microphone which can prevent breakdown of an acoustic transducer, and can be installed outside a cabin of a vehicle with high environmental resistance by preventing ingress of water, rubbish, or dust. By using the microphone according to the embodiments, it is possible to provide a practical vehicle trunk opening and closing system, a vehicle door opening and closing system, a vehicle light illumination system, or a sound source direction estimation device which has high environmental resistance.

BRIEF DESCRIPTION OF THE DRAWINGS

FIGS. 13(a) to 13(d) are schematic diagrams illustrating the structure of a microphone according to a seventh embodiment of the invention.

DETAILED DESCRIPTION OF THE EXEMPLARY EMBODIMENTS

Materials used in the embodiments are exemplified as preferred examples, but the invention is not limited to the materials. Modifications can be made appropriately within the scope of the invention without departing from the gist of the invention. Combinations of different embodiments are possible within the scope without inconsistency.

(First Embodiment)

Hereinafter, a first embodiment of the invention will be described in detail with reference to FIGS. 1(a) to 2.

Figure 1B:
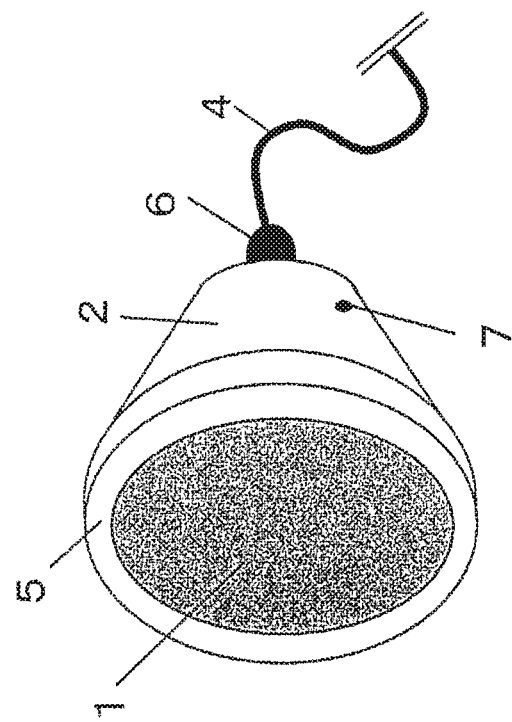
FIGS. 1(a) and 1(b) are a sectional view and a perspective view illustrating the structure of a microphone according to a first embodiment of the invention.
Figure 1A:
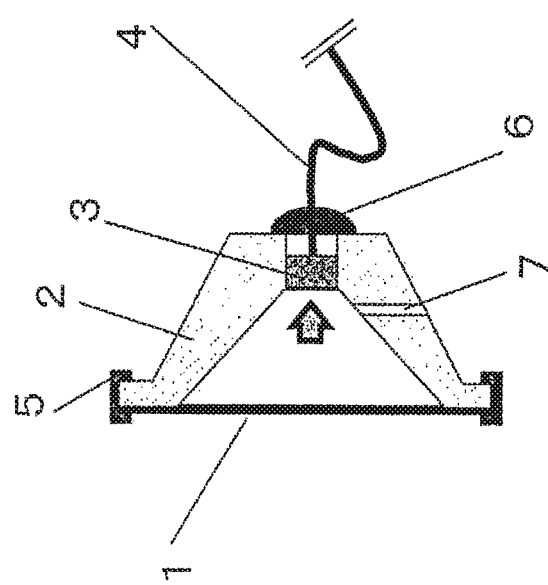
Figure 2:
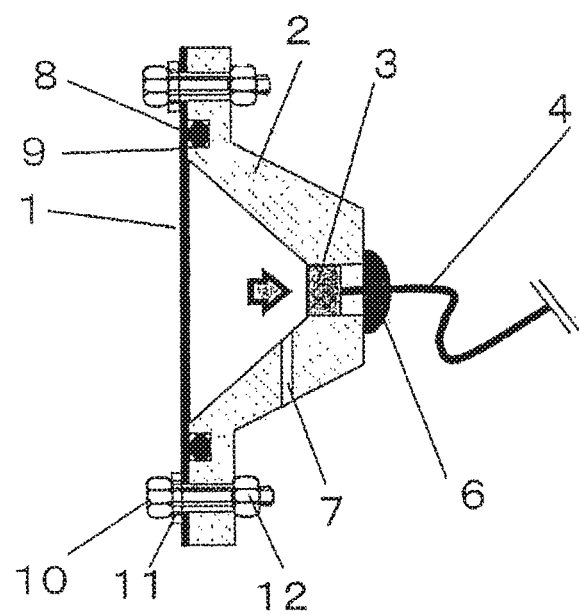
FIG. 2 is a sectional view illustrating the structure of the microphone according to a modification example of the first embodiment of the invention.

FIGS. 1(a) and 1(b) are schematic diagrams illustrating the structure of a microphone according to the first embodiment of the invention. FIG. 1(a) is a sectional view of the microphone and FIG. 1(b) is a perspective view of the microphone.

As illustrated in FIGS. 1(a) and 1(b), the microphone according to the embodiment is configured to include a diaphragm 1, a frame 2, an acoustic transducer 3, a wire 4 that transmits a signal of the acoustic transducer 3 to the outside or supplies power to the acoustic transducer 3, and a packing 5 that prevents ingress of water, rubbish, or dust from a connection portion of the diaphragm 1 and the frame 2, and a resin coating member 6 that prevents ingress of water, rubbish, or dust from a gap between the frame 2 and the wire 4.

In FIG. 1(a), the internal shape of the frame 2 is the shape of a conical surface, but the internal shape may be the shape of a semispherical surface or the shape of a parabolic surface.

In FIG. 1(a), a leak hole 7 is formed, as necessary. The leak hole is formed, as necessary, in a case in which a difference occurs between the internal pressure of the microphone and the external pressure of the microphone and the difference in the pressure is cancelled. A sealing member (not illustrated) may be disposed in a connection portion of the diaphragm 1 and the frame 2, as necessary. As the material of the sealing member, for example, PTFE (polytetrafluoroethylene; product name: Teflon (registered trademark)), PFA (tetra-fluoroethylene perfluoroalkyl vinyl ether copolymer), or FEP (tetrafluoroethylene-hexafluoropropylene copolymer) which is fluororesin or a silicone rubber is appropriately selected. As the material of the resin coating member 6, a resin material such as a silicon-based resin, a urethane-based resin, or a polysulfide-based resin is appropriately selected.

The microphone illustrated in FIGS. 1(a) and 1(b) according to the embodiment has substantially the same structure as a stethoscopy portion of a stethoscope used in medical fields, except for the acoustic transducer 3, the wire 4, the packing 5, the resin coating member 6, and the leak hole 7.

For the diaphragm 1, the microphone according to the embodiment is different from a stethoscope coming into contact with a human body and collecting a sound of the inside of the human body in that the microphone collects a sound in the periphery of the own vehicle. The diaphragm 1 has substantially the same role as a diaphragm of a stethoscope. That is, the diaphragm vibrates to collect a sound. In the microphone according to the embodiment, the collected sound is converted into an electric signal by the acoustic transducer 3 accommodated inside the frame 2. A sound input direction to the acoustic transducer 3 according to the embodiment is a direction indicated by an arrow illustrated in FIG. 1(a). As the acoustic transducer 3 according to the embodiment, specifically, one of an electret condenser microphone (ECM), a commonly called silicon microphone manufactured using an MEMS technology or a micromatching technology, and a dynamic microphone is appropriately selected. The internal shape of the frame 2 is the shape of a conical surface. The internal shape of the frame 2 may be the shape of a semispherical surface or a parabolic surface as well as the shape of the conical surface. In any case, the internal shape of the frame 2 has an effect of collecting a sound input to the acoustic transducer 3 and improving the sensitivity of a microphone.

In the embodiment, the packing 5 is disposed to prevent ingress of water, rubbish, or dust from a connection portion of the diaphragm 1 and the frame 2. Instead of the packing, a resin coating member (not illustrated) may be disposed or an O ring 8 illustrated in FIG. 2 may be used. In FIG. 2, an O ring groove 9 is formed in the frame 2 to correspond to the O ring 8. In the drawing, bolts 10, washers 11, and nuts 12 joining the diaphragm 1 to the frame 2 are installed.

Figure 3:
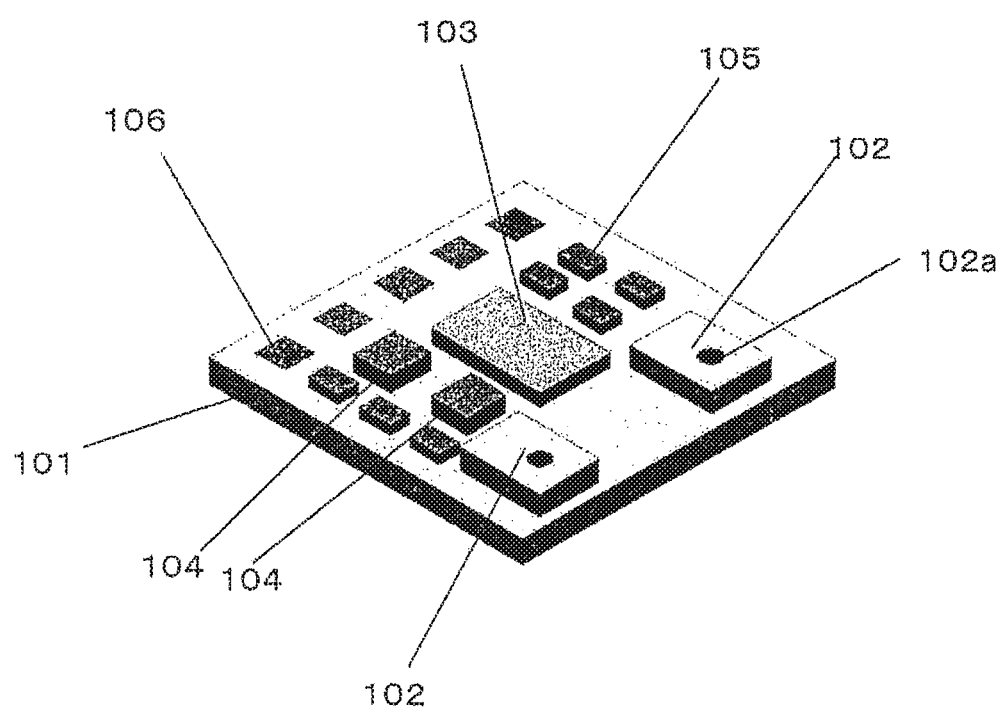
FIG. 3 is a perspective view illustrating the structure of an acoustic transducer according to the first embodiment of the invention.

In the acoustic transducer 3 illustrated in FIGS. 1(*a*), 1(*b*), and 2, the number of acoustic transduction elements is not limited to 1. FIG. 3 illustrates an example of the acoustic transducer according to the invention.

In the acoustic transducer illustrated in FIG. 3 according to the embodiment, a plurality of acoustic transduction elements 102 (two acoustic transduction elements in the drawing) that converts sound pressure into electric signals are disposed on a circuit substrate 101. Reference numeral 102*a* denotes a sound hole which is a sound input hole disposed inside the acoustic transduction element 102. In the acoustic transducer, an LSI 103 performing a sound synthesis process, microcomputers 104 (two microcomputers in the drawing), and capacitance or resistance elements 105 are disposed so that electric signal processing is performed. Pads 106 for transmission of electric signals to the outside are installed. Wires or the like (not illustrated) are connected to the pads 106, so that power is input to the acoustic transducer or electric signals processed by the acoustic transducer are transmitted to the outside.

As illustrated in FIG. 3, when the plurality of acoustic transduction elements are used, the acoustic transducer can perform signal processing such as noise suppression, sound synthesis, and sound recognition.

The microphone according to the embodiment is different from a general microphone in that the constituent elements includes the packing 5 preventing ingress of water, rubbish, or dust from the connection portion of the diaphragm 1 and the frame 2 and the resin coating member 6 preventing ingress of water, rubbish, or dust from the gap between the frame 2 and the wire 4. Therefore, water, rubbish, or dust does not become attached to the acoustic transducer 3 which may be broken down in case that water, rubbish, or dust becomes attached. Thus, it is possible to provide the practical microphone that is proper for outside installation of a vehicle cabin since the microphone can be installed outside a cabin of a vehicle for which high environmental resistance is necessary.

(Second Embodiment)

Hereinafter, a second embodiment of the invention will be described in detail with reference to FIG. 4.

Figure 4:
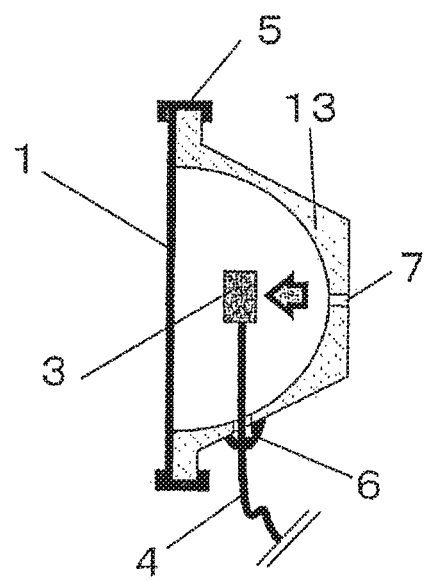
FIG. 4 is a sectional view illustrating the structure of a microphone according to a second embodiment of the invention.

FIG. 4 is a schematic sectional view illustrating the structure of a microphone according to the second embodiment of the invention. As illustrated in FIG. 4, the microphone according to the embodiment is different from the microphone in FIG. 1(*a*) according to the first embodiment in the internal shape of a frame 13, a disposal position and a sound input direction (indicated by an arrow in FIG. 4) of the acoustic transducer 3.

In the embodiment, the internal shape of the frame 13 is the surface of a parabolic surface used for a parabolic antenna. This is because a sound to be input is indicated by the arrow in FIG. 4 in the acoustic transducer 3. By collecting the sound in the shape of the parabolic surface, it is possible to realize a telephoto microphone capable of collecting a more distant sound than the shape of the microphone described in the first embodiment. As in the first embodiment, water, rubbish, or dust is not attached to the acoustic transducer 3 which may be broken down in case that water, rubbish, or dust is attached. Thus, it is possible to provide the practical microphone that is proper for outside installation of a vehicle cabin since the microphone can be installed outside a cabin of a vehicle for which high environmental resistance is necessary.

(Third Embodiment)

Figure 5A:
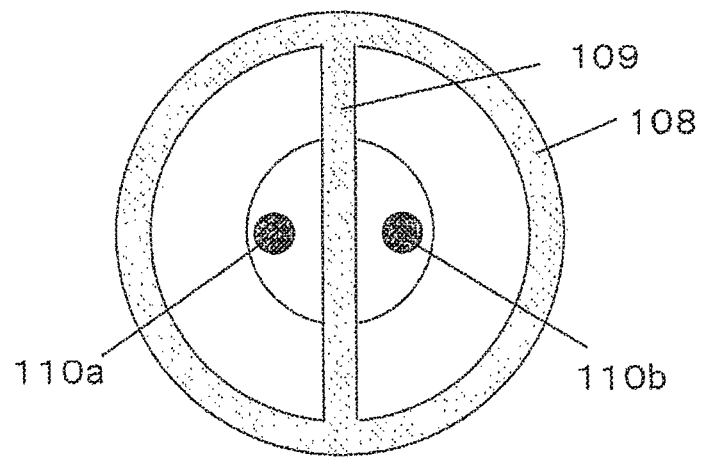
FIGS. 5(a) and 5(b) are a plan view and a sectional view illustrating the structure of a microphone according to a third embodiment of the invention.
Figure 5B:
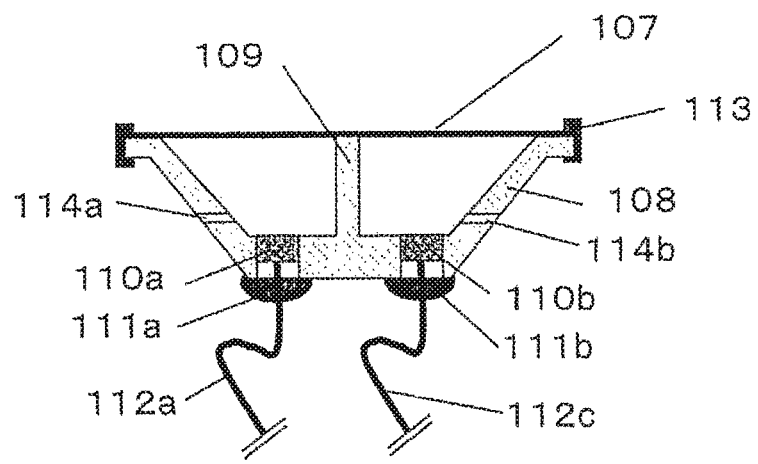

Hereinafter, a third embodiment of the invention will be described in detail with reference to FIGS. 5(*a*), 5(*b*), and 6.

The embodiment is different from the first and second embodiments in that a plurality of acoustic transducers are present.

FIGS. 5(*a*) and 5(*b*) are schematic diagrams illustrating the structure of a microphone according to the third embodiment of the invention. FIG. 5(*a*) is a plan view illustrating the microphone from which a diaphragm 107 and a packing 113 are excluded. FIG. 5(*b*) is a sectional view illustrating the microphone.

As illustrated in FIGS. 5(*a*) and 5(*b*), the microphone according to the embodiment is configured to include the diaphragm 107, a frame 108 having a partition wall 109, two acoustic transducers 110*a* and 110*b*, wires 112*a* and 112*b* that transmit signals of the acoustic transducers to the outside or supply power to the acoustic transducers, the packing 113 that prevents ingress of water, rubbish, or dust from a connection portion of the diaphragm 107 and the frame 108, and resin coating members 111*a* and 111*b* that prevent ingress of water, rubbish, or dust from gaps between the frame and the wires. Leak holes 114*a* and 114*b* are formed, as necessary. The leak holes are formed, as necessary, in a case in which a difference occurs between the internal pressure of the microphone and the external pressure of the microphone and the difference in the pressure is cancelled.

In FIG. 5(*b*), the internal shape of the frame 108 is the shape of a conical surface, but the internal shape may be the shape of a semispherical surface or the shape of a parabolic surface.

In the embodiment, the example in which one partition wall and two acoustic transducers are disposed has been described. However, the number of partition walls and the number of acoustic transducers are not limited thereto. A plurality of partition walls and a plurality of acoustic transducers may be configured to be disposed.

Incidentally, the microphone including two or more acoustic transducers (or acoustic transduction elements disposed in the acoustic transducer) can perform a sound synthesis process of suppressing noise through signal processing and extracting only a sound as a signal output in a case in which the microphone receives sound pressure having the sound and surrounding noise (hereinafter referred to combined sound pressure). The embodiment is an embodiment relating to the microphone performing the sound synthesis process.

In the structure of the microphone according to the embodiment, the frame 108 includes the partition wall 109. Therefore, the diaphragm 107 vibrates in a two-partitioned state partitioned by the partition wall 109 and, the acoustic transducers 110*a* and 110*b* sense respective vibration of the diaphragm in the two-partitioned state. The acoustic transducer including two or more acoustic transduction elements illustrated in FIG. 3 according to the first embodiment is more convenient in a sound synthesis process for performing the sound synthesis process than the microphone configured to include only one diaphragm illustrated in FIGS. 1(a) and 1(b) according to the first embodiment. The reason is that when the sound synthesis process such as noise suppression is performed, it is necessary to acquire phase information regarding combined sound pressure with high precision. When the sound synthesis is performed, the phase of the combined sound pressure is decided by a time of the sound pressure reaching from a sound source to the acoustic transduction element. When the number of diaphragms of the microphone is one, the combined sound pressure corresponding to one diaphragm although the plurality of acoustic transduction elements are disposed. Therefore, even when two or more acoustic transduction elements are disposed, a phase difference may not be detected. However, when each diaphragm and each acoustic transduction element is paired, a phase difference in the combined sound pressure can be acquired. When the phase difference in the combined sound pressure can be acquired, the sound synthesis process can be performed reliably.

Figure 6:
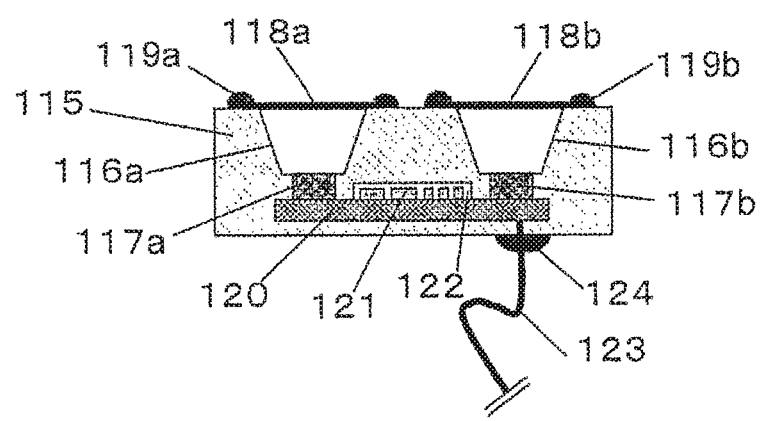
FIG. 6 is a sectional view illustrating the structure of a microphone according to a modification example of the third embodiment of the invention.

FIG. 6 is a sectional view illustrating the structure of a microphone according to a modification example of the embodiment.

As illustrated in FIG. 6, the microphone according to the embodiment is configured to include two diaphragms 118a and 118b, a frame 115 processed in two internal shapes 116a and 116b with the shapes of conical surface, two acoustic transducers 117a and 117b, a circuit substrate 120, an electronic component group 121 such as an LSI or chip components mounted on the circuit substrate 120, a wire 123, resin sealing members 119a and 119b that prevent ingress of water, rubbish, or dust from connection portions of the diaphragms and the frame, and a resin sealing member 124 that prevents ingress of water, rubbish, or dust from a connection portion of the frame and the wire. Inside the frame 115, a space 122 is formed to dispose the electronic component group 121.

In FIG. 6, the internal shapes 116a and 116b of the frame 115 are the shape of the conical surface, but the shape of a semispherical surface or a parabolic surface may be used as the internal shapes.

In the embodiments, the example in which two diaphragms and two acoustic transducers are disposed has been described, but the number of diaphragms and the number of acoustic transducers are not limited thereto. A plurality of diaphragms and a plurality of acoustic transducers may be configured to be disposed. The microphone illustrated in FIG. 6 has the structure in which the diaphragms and the acoustic transducers are independently paired. Therefore, the same effects as those of the microphone illustrated in FIGS. 5(a) and 5(b) and the sound synthesis process can be performed reliably.

As described above, according to the embodiment, as in the first and second embodiments, water, rubbish, or dust is not attached to the acoustic transducer which may be broken down in case that water, rubbish, or dust is attached. Thus, it is possible to provide the practical microphone that is proper for outside installation of a vehicle cabin since the microphone can be installed outside a cabin of a vehicle for which high environmental resistance is necessary. It is also possible to provide the microphone useful when the sound synthesis process is performed.

(Fourth Embodiment)

Hereinafter, a fourth embodiment of the invention will be described in detail with reference to FIGS. 7 to 9.

The embodiment is an embodiment in which the invented microphone is used to control a vehicle-mounted device through voice recognition.

An example of a device controlling a vehicle-mounted device includes a smart entry device. A smart entry is a device that opens a door of a vehicle even when a driver or the like puts a smart entry device in a pocket or a bag and approaches the vehicle. The smart entry is a control device capable of controlling a door of a vehicle in an unlocked state without inserting a key into the door of the vehicle. In the structure of the smart entry, a vehicle and a smart entry device mutually send radio waves, authentication of a registration ID of the smart entry device is performed when a distance between the vehicle and the smart entry device is within a communicable range, and lock of a door of the vehicle is released when the registration ID is identical.

On the other hand, the trunk of a vehicle does not open even when the smart entry device approaches. This is because it is not necessary to open the trunk of the vehicle whenever the smart entry device approaches. When the trunk is to be opened, the trunk can be opened by pressing a trunk opening or closing button disposed outside the trunk even when the driver has the smart entry device. However, when the driver or the like holds large loads such as golf bags with both hands and both hands are full, the driver has to lay down the loads every time to open the trunk, which is inconvenient.

The embodiment provides a system opening and closing the trunk without pressing the trunk opening or closing button using the microphone according to the invention even in a case in which the driver or the like holds loads or the like and both hands are full.

Figure 7:
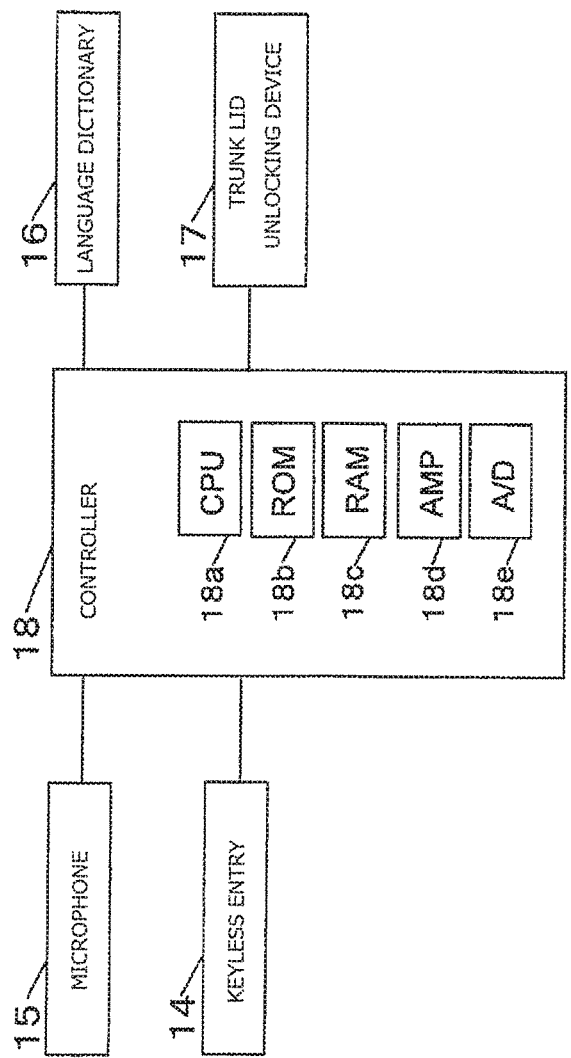
FIG. 7 is a block diagram illustrating a system configuration according to a fourth embodiment of the invention.

FIG. 7 is a block diagram illustrating a system configuration according to the embodiment. A keyless entry device 14 and a microphone 15 are electrically connected to a controller 18. A language dictionary 16 that analyzes words collected by the microphone 15 and a trunk lid unlocking device 17 are also electrically connected to the controller 18. When the trunk lid unlocking device 17 enters an ON state, the trunk of the vehicle is opened. The controller 18 is configured to include a CPU 18a, an ROM 18b, an RAM 18c, an AMP 18d, and an A/D converter 18e.

Figure 8:
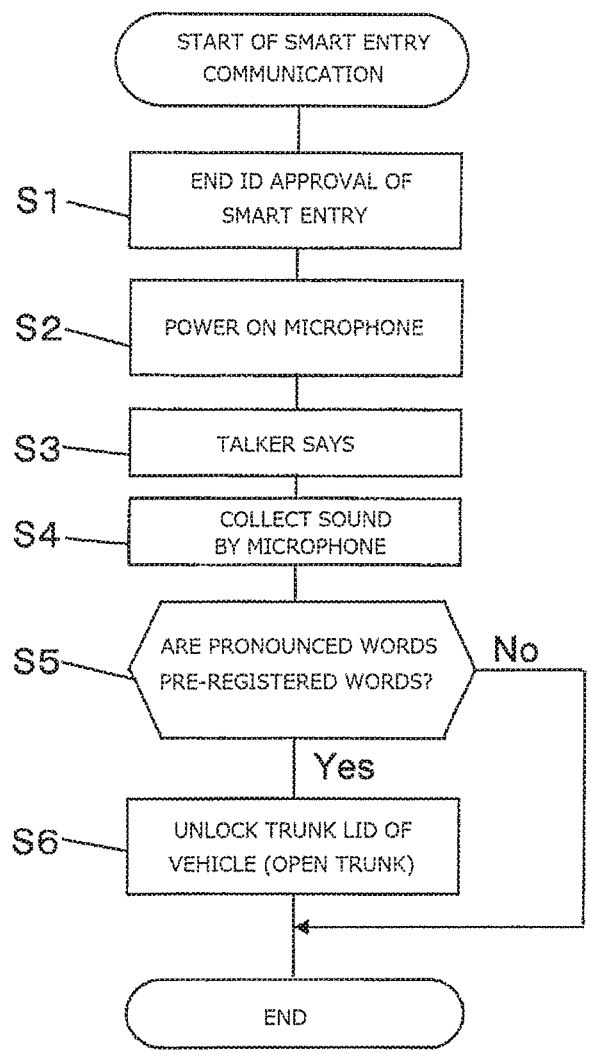
FIG. 8 is a flowchart illustrating an operation according to the fourth embodiment of the invention.

FIG. 8 is a flowchart illustrating an operation according to the embodiment.

First, when the driver putting the smart entry device in a pocket or a bag approaches a vehicle, the vehicle and the smart entry device start communication. When ID approval of the smart entry ends in step S1, the microphone 15 is powered on in step S2. When the driver or the like says pre-decided words, for example, "Open trunk!", near the microphone 15 in step S3, the microphone 15 collects the sound in step S4. In step S5, it is verified whether the said words are pre-registered words. When the said words are identical to the pre-registered words, the process proceeds to step S6. In step S6, when the trunk lid of the vehicle is unlocked, the trunk is opened, and the present process ends. Conversely, when the said words are not identical to the pre-registered words, the present process ends directly.

In FIG. 8, the flow of the opening of the trunk has been described. It is needless to say that the trunk can be closed in the same flow.

Figure 9:
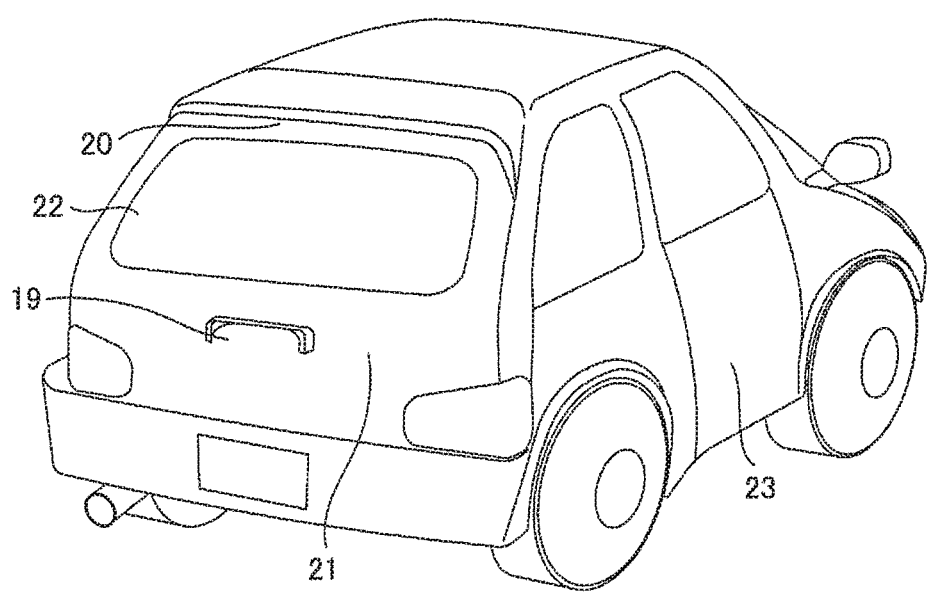
FIG. 9 is a perspective view illustrating a microphone disposal position when viewed from a rear side of a vehicle according to the fourth embodiment of the invention.

FIG. 9 illustrates an example of a position at which the microphone is fitted on a vehicle.

The microphone disposed outside the vehicle cabin is preferably disposed at a location in which the microphone is rarely wet by rain or the like outside the vehicle. In FIG. 9, by installing the microphone in a knob portion 19 of the trunk touched by a hand at the time of manual opening of the trunk or a lower portion 20 of a rear spoiler, the microphone is rarely wet by rain or the like more than other vehicle portions.

In FIG. 9, the microphone can be disposed in each of an inside 21 of a trunk room, an inside 22 of a rear glass, and an inside 23 of a door. The disposition location of the microphone is not necessarily limited to the outside of the vehicle cabin, but may be a portion inside the vehicle in which utterance of a speaker can be collected.

In the embodiment, the trunk opening and closing system has been described, but the invention is not limited to the trunk opening and closing system. The invention can also be applied to opening and closing of an electric slide door or a light turning-on/off system of a vehicle. When an electric slide door can be opened and closed without using a hand, convenience is realized, for example, in a case in which a baby carriage is folded and put into a vehicle cabin or a wheelchair is put into a vehicle cabin. Thus, the work of a person can be reduced. When a light of a vehicle can be turned on/off by a voice, for example, an object can be searched for in a dark place or presence of the own vehicle can be informed to the surroundings without return to a driver's seat, and thus convenience of use of the vehicle is improved.

(Fifth Embodiment)

Hereinafter, a fifth embodiment of the invention will be described in detail with reference to FIGS. 10 and 11. The embodiment is different from the fourth embodiment in that a mechanism prompting a talker such as a driver to speak.

Figure 10:
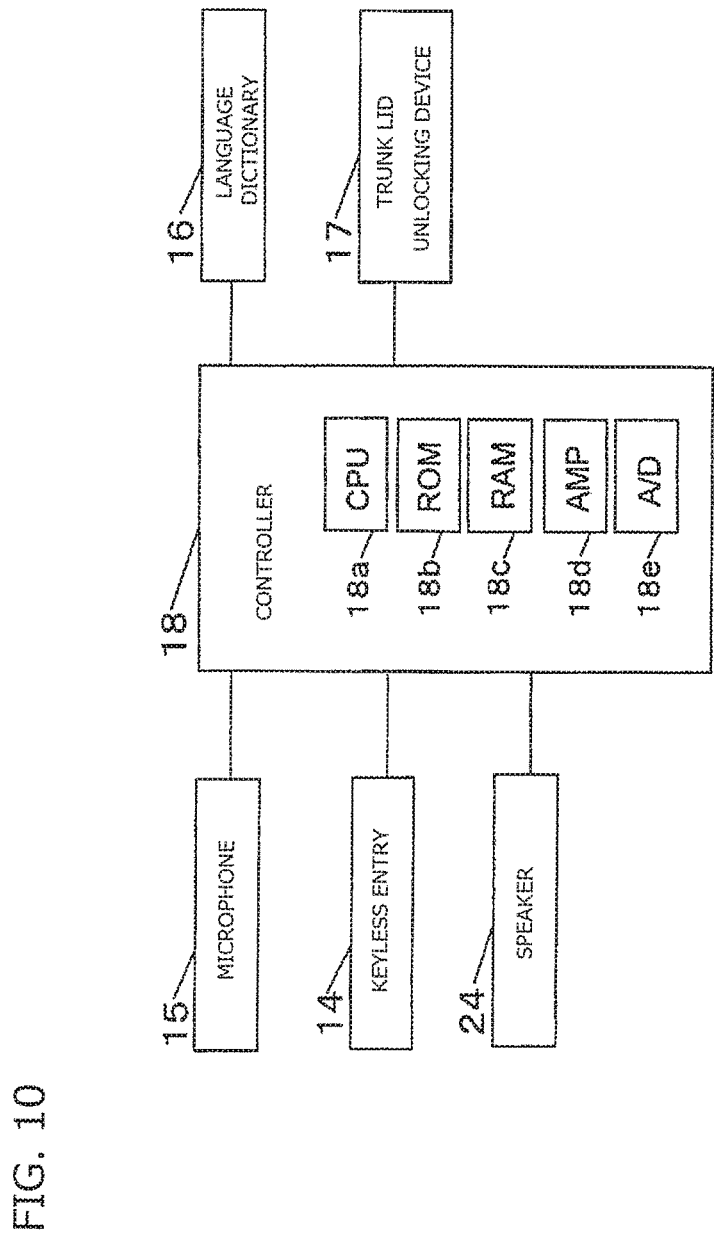
FIG. 10 is a block diagram illustrating a system configuration according to a fifth embodiment of the invention.

FIG. 10 is a block diagram illustrating a system configuration according to the embodiment. The diagram is different from FIG. 7 according to the fourth embodiment in that a speaker 24 is provided.

Figure 11:
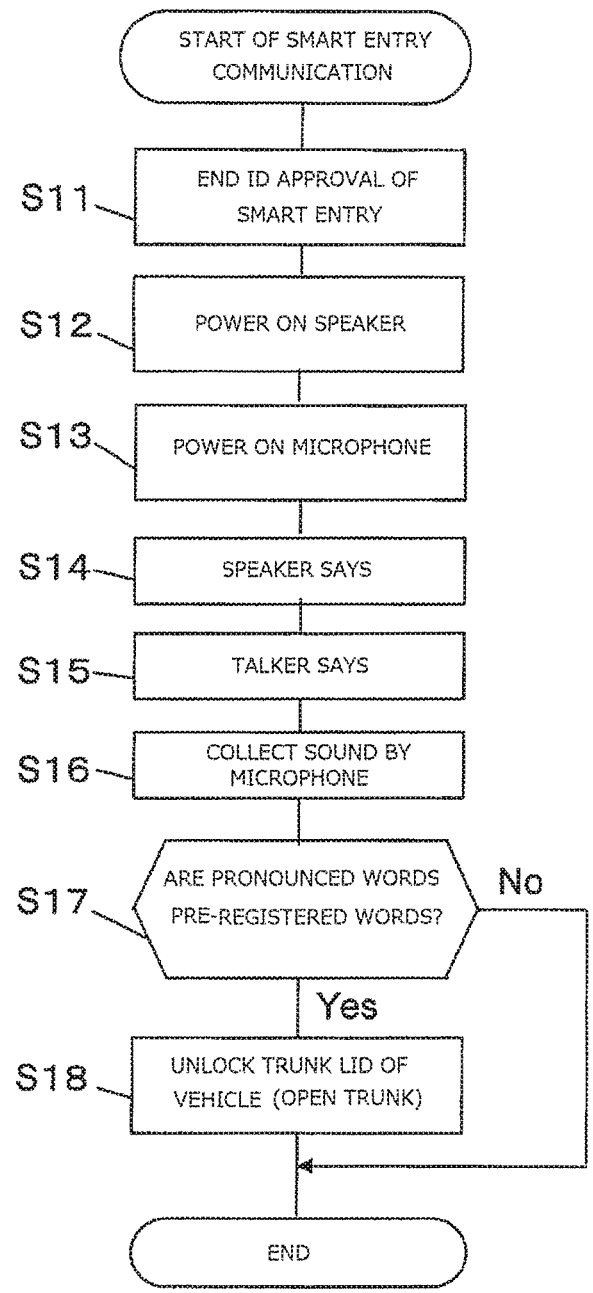
FIG. 11 is a flowchart illustrating an operation according to the fifth embodiment of the invention.

FIG. 11 is a flowchart illustrating an operation according to the embodiment. The drawing is different from FIG. 8 described in the fourth embodiment in step (S12 of FIG. 11) in which the speaker is powered on and a step (S14 of FIG. 11) in which the speaker pronounces.

In the flowchart illustrated in FIG. 11, first, when the driver putting the smart entry device in a pocket or a bag approaches a vehicle, the vehicle and the smart entry device start communication. When ID approval of the smart entry ends in step S11, the speaker and the microphone are each powered on in steps S12 and S13. In step S14, in this state, pre-decided words, for example, "Welcome!", are pronounced from the speaker 24 of the vehicle due to a state in which the talker such as a driver is close to the vicinity of the microphone 15. This operates to prompt the talker such as a driver to input a pronunciation voice. When the driver or the like prompted to pronounce the voice says pre-decided words, for example, "Open trunk!" in step S15, the microphone 15 collects the voice in step S16. In step S17, it is verified whether the said words are pre-registered words. When the said words are identical to the pre-registered words, the process proceeds to step S18. In step S18, when the trunk lid of the vehicle is unlocked, the trunk is opened, and the present process ends. Conversely, when the said words are not identical to the pre-registered words, the present process ends directly.

In FIG. 11, the flow of the opening of the trunk has been described. It is needless to say that the trunk can be closed in the same flow.

In the embodiment, the trunk opening and closing system has been described, but the invention is not limited to the trunk opening and closing system. The invention can also be applied to opening and closing of an electric slide door or a light turning-on/off system of a vehicle.

(Sixth Embodiment)

Hereinafter, a sixth embodiment of the invention will be described in detail with reference to FIG. 12.

A vehicle recognition device that detects a traveling sound of a vehicle approaching the own vehicle and ensures safety of the own vehicle by disposing a plurality of microphones in the own vehicle is known.

Figure 12:
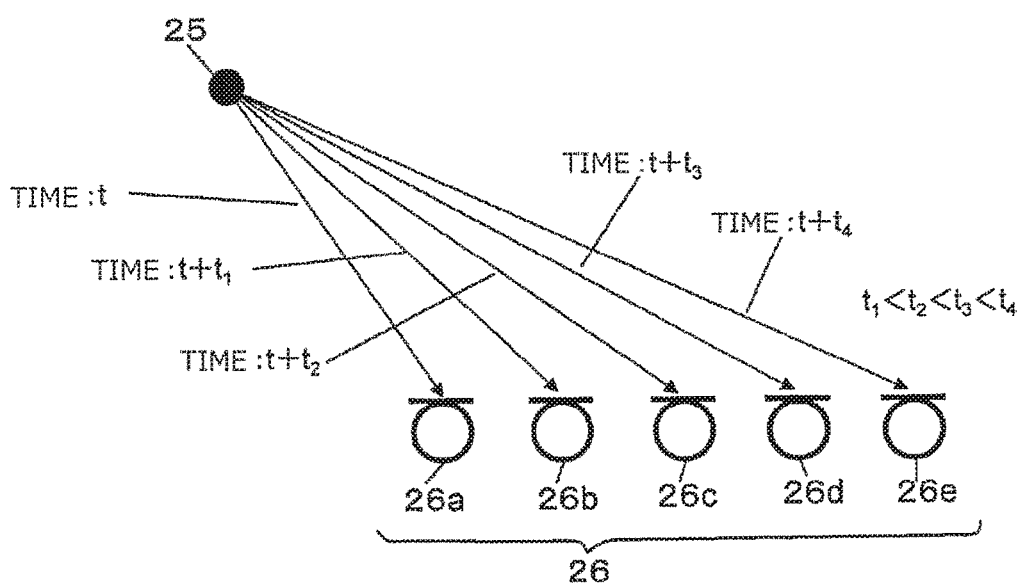
FIG. 12 is a diagram illustrating a principle of nearby vehicle detection according to a sixth embodiment of the invention.

FIG. 12 is a diagram illustrating a principle of a method of detecting a vehicle approaching the own vehicle.

In FIG. 12, a vehicle approaching the own vehicle is illustrated as a sound source 25 and a plurality of microphones 26 (26a to 26e) are provided with respect to this. A time at which a sound arrives from the sound source 25 is different for each microphone (arrival times to the microphones are written as "t+$t_1$" and the like in FIG. 12). From this phenomenon, by performing a numerical value calculation process based on arrival times of the sounds arriving at the microphones, it is possible to detect a vehicle approaching the own vehicle.

By using the microphone according to the invention, for example, a device detecting a sound outside a vehicle, as disclosed in PTL 1 (Pamphlet of International Publication No. WO 2011/136234), can be realized as a practical device detecting a sound outside a vehicle in consideration of environmental resistance such as rainfall.

(Seventh Embodiment)

Hereinafter, a seventh embodiment of the invention will be described in detail with reference to FIGS. 13($a$) to 15($b$).

The embodiment provides a form of a microphone which is not broken down by protecting the microphone disposed outside an automobile against a stepping stone kicked up by a tire during traveling of the automobile or water or water drops kicked up by a tire during traveling of the automobile in case of rain when the microphone is installed outside the automobile.

FIGS. 13($a$) to 13($d$) are schematic diagrams illustrating the structure of a microphone according to the seventh embodiment of the invention. FIG. 13($a$) is a perspective view illustrating the outer appearance of the microphone when viewed from the upper side. FIG. 13($b$) is a perspective view illustrating the outer appearance of the microphone when viewed from the lower side. FIG. 13($c$) is a sectional view illustrating the microphone. FIG. 13($d$) is a perspective view illustrating the outer appearance configurations of components of the microphone.

A microphone 201 illustrated in FIGS. 13($a$) to 13($d$) according to the embodiment is configured to include a first case frame 203 in which a latticed beam 202 is disposed, a first film membrane 205 in which through holes 204 are formed and which operates as an acoustic seal, a second film membrane 206 which prevents ingress of water or dirt into the inside, an internal case 209 which includes a plurality of conical counterbores 207 and a plurality of through holes 208, an acoustic transduction module 212 which is configured to include an electric signal connection connector 211 and a plurality of acoustic transducers 210, a circuit substrate 215 on which an electric signal connection connector 213 and a plurality of electronic components 214 are mounted, a socket 218 which includes an electric signal connection connector 217 and a connector 216 performing electric connection to the outside of the microphone, and a second case frame 219.

In FIG. 13($d$), the acoustic transducer 210 of the acoustic transduction module 212 is illustrated as an example of the acoustic transducer in an electret condenser microphone (ECM) and is installed in empty holes formed inside the internal case 209, as illustrated in FIG. 13($c$). The second film membrane 206 is joined to the upper surface of the internal case 209 to prevent ingress of water or dirt into the inside. A rubbery elastic member is used as the material of the first film membrane 205. The first film membrane 205 functions as an acoustic seal so that sound pressure received by the acoustic transducers 210 does not diffuse between the second film membrane 206 and the first case frame 203. When the first case frame 203 and the second case frame 219 are assembled, a claw portion 220 disposed in the first case frame 203 and a claw portion 221a disposed in the second case frame 219 are fitted for assembly.

Although not illustrated, resin sealing members are applied to connection portions of the first case frame 203 and the second case frame 219 and the second case frame 219 and the connector 216 of the socket 218 in order to prevent ingress of water or dirt into the inside of the microphone 201.

In the microphone 201, the latticed beam 202 (in the drawing, precisely, a latticework shape designed for beams only in the horizontal direction) is disposed. Therefore, even in case in which the microphone is installed outside an automobile and the automobile travels, the inside of the microphone can be protected against from a flying object such as a stepping stone kicked up by a tire during the traveling. The shape of the latticed beam 202 is not limited to the form of the latticework illustrated in the drawing, but may be the form of a latticed shape in which a beam is disposed vertically and horizontally, the form of a mesh shape, or a plate shape in which many holes are formed.

In the microphone 201, the second film membrane 206 preventing ingress of water or dirt into the inside is disposed. However, the second film membrane 206 is an elastic member and has a function of weakening the hydraulic pressure of water kicked up by a tire during traveling and protecting the inside of the microphone 201 when the microphone is installed outside an automobile and the automobile is traveling.

Figure 14A:
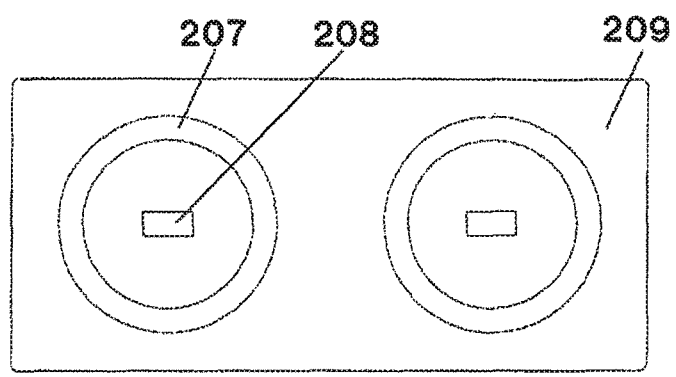
FIGS. 14(a) and 14(b) are diagrams illustrating an inner case inside the microphone according to the seventh embodiment of the invention.
Figure 14B:
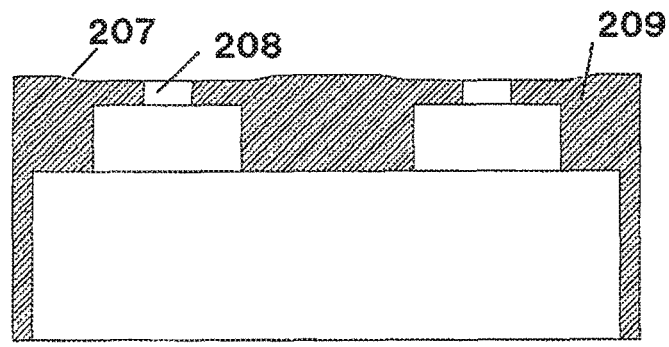
Figure 15:
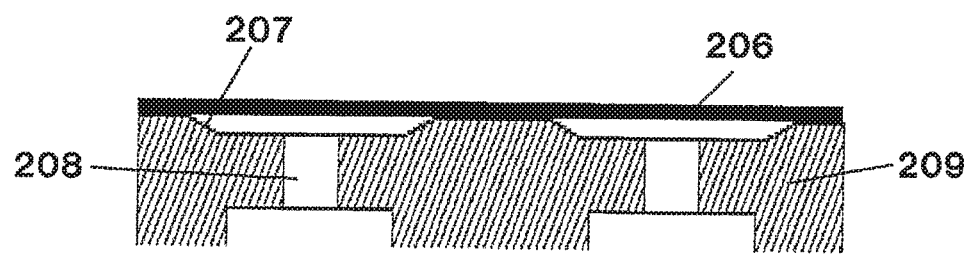
FIGS. 15(a) and 15(b) are schematic diagrams illustrating a function of weakening hydraulic pressure by elastic deformation of a second film membrane according to the seventh embodiment of the invention.
Figure 15:
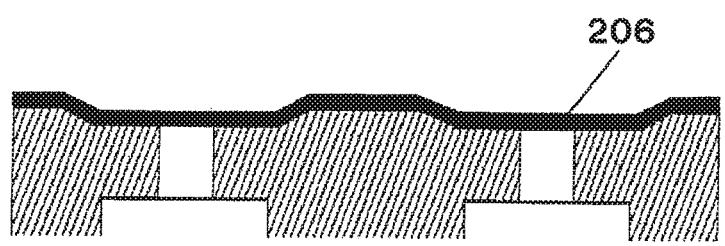

FIGS. 14, 15(a), and 15(b) are schematic diagrams illustrating a function of weakening hydraulic pressure through elastic deformation of the second film membrane 206.

FIGS. 14(a) and 14(b) are diagrams illustrating only the extracted internal case 209 in the microphone 201 illustrated in FIGS. 13(a) to 13(d). FIG. 14(a) is a top view illustrating the internal case 209 and FIG. 14(b) is a sectional view illustrating the internal case 209.

FIGS. 15(a) and 15(b) are expanded views illustrating the conical counterbores 207 and the through holes 208 of the internal case 209 illustrated in FIG. 14 and illustrating a state in which the second film membrane 206 is attached to the upper surface of the internal case 209. FIG. 15(a) illustrates a state in which the second film membrane 206 does not receive the hydraulic pressure of water and FIG. 15(b) illustrates a state in which the second film membrane 206 receives the hydraulic pressure of water. In the state of FIG. 15(b), the second film membrane 206 receives the hydraulic pressure and is elastically deformed. The second film membrane 206 is elastically deformed by the hydraulic pressure to absorb the hydraulic pressure. When the tensile force of the film membrane is strong to the degree that the second film membrane 206 is not elastically deformed by hydraulic pressure, the film membrane is damaged (torn) due to the hydraulic pressure in some cases. However, the elastically deformed second film membrane 206 can protect the inside of the microphone without damage by the hydraulic pressure. The form of the second film membrane 206 is a porous film or a film with no hole. For example, when PTFE (polytetrafluoroethylene) or a silicon-based film is used as the film material, a film membrane having performance of weather resistance, flame resistance, chemical resistance, or the like can be realized. Preferably, when extension PTFE is used as the film membrane, the extension PTFE has a plurality of minute through holes. However, since water does not infiltrate in the thickness direction of the film membrane and only sound pressure can pass in the thickness direction of the film membrane, a frequency bandwidth in which the sound pressure of the microphone can be detected can spread compared to a case in which a film membrane with no hole is used.

As described above, by configuring the microphone in the above-described manner, it is possible to realize the microphone which is installed outside an automobile cabin and is not broken down by protecting the microphone against a stepping stone kicked up by a tire during traveling of the automobile or water or water drops kicked up by a tire during traveling of the automobile in case of rain.

The microphone having the configuration can also be applied as an underwater microphone used underwater as well as the microphone which is installed outside an automobile cabin.

(Eighth Embodiment)

Hereinafter, an eighth embodiment of the invention will be described in detail with reference to FIGS. 16 and 17.

The embodiment provides the form of a microphone which is disposed outside an automobile and is not broken down when the microphone is installed outside the automobile by protecting the microphone against high-pressure water ejected from a nozzle of a high-pressure washer, for example, when an automobile is washed.

Figure 16:
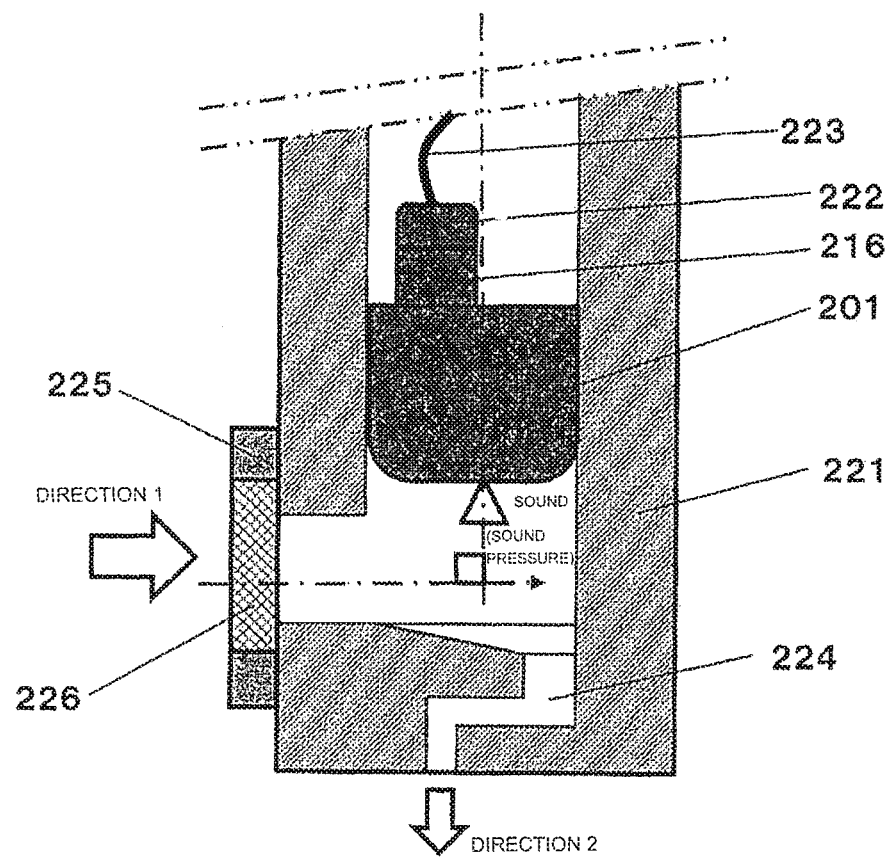
FIG. 16 is a schematic sectional view illustrating an installation form of a microphone according to an eighth embodiment of the invention.

FIG. 16 is a schematic sectional view illustrating an installation form of a microphone 201 according to the eighth embodiment of the invention. The microphone 201 is installed inside a case frame 221. The microphone 201 is connected to an external connector 222 and a wire cable 223 via a connector 216 to be electrically connected to the outside. When a commercially available waterproof connector is used as the external connector 222, a waterproof function is improved. A drain 224 for water removal is disposed inside the case frame 221. A frame cover 225 in which a mesh-shaped ventilation portion (sound pressure input portion) 226 is installed is disposed in a sound entrance of the case frame 221. The case frame 221 may be an independent case frame or the case frame may be a part of the body of an automobile. A sound (sound pressure) acquired by the microphone 201 is input in a direction 1 illustrated in FIG. 16. An angle of the direction 1 and an angle of the sound input of the microphone 201 form 90° (right angle). The configuration illustrated in FIG. 16 is referred to as a microphone unit.

Incidentally, on the assumption of a case in which an automobile on which the microphone unit illustrated in FIG. 16 is mounted is washed by a high-pressure washer, high-pressure water ejected from a nozzle of the high-pressure washer infiltrate inside the case frame 221 via the ventilation portion 226 in the direction 1 illustrated in FIG. 16. However, since the pressure of the ejected high-pressure water is weakened by the mesh of the ventilation portion 226 and does not directly arrive at the microphone 201 either, it is possible to prevent the second film membrane 206 or the like inside the microphone 201 from being damaged by the water pressure. The water infiltrating the inside of the case frame 221 via the ventilation portion 226 drains in a direction 2 illustrated in FIG. 16 from the drain 224 for water removal.

Figure 17:
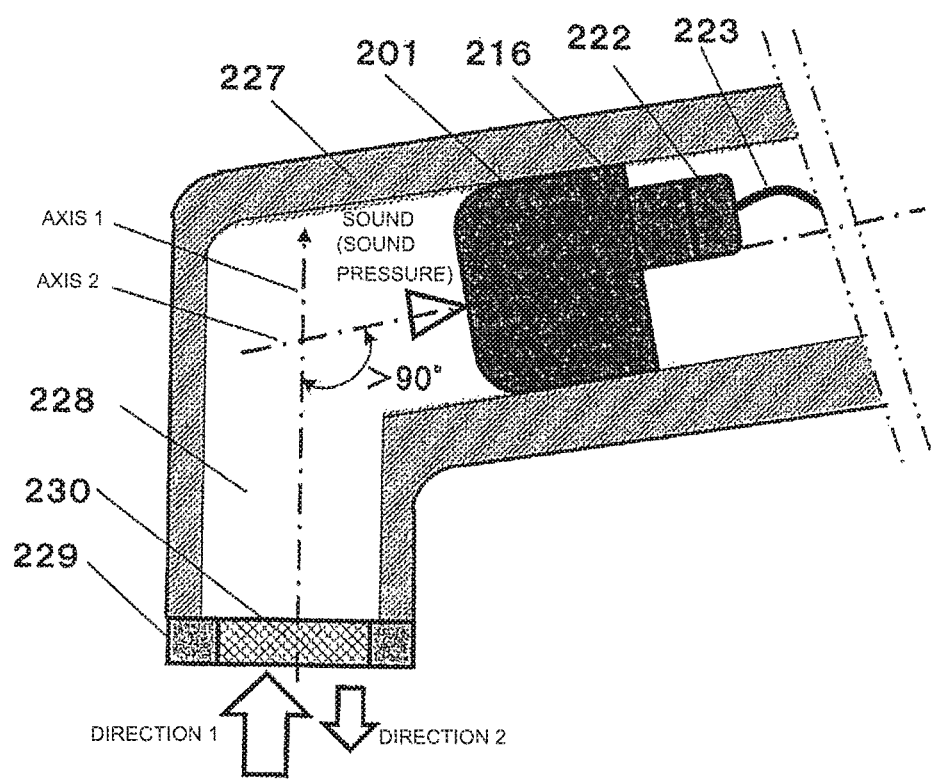
FIG. 17 is a schematic sectional view illustrating an installation form of a microphone according to the eighth embodiment of the invention.

FIG. 17 is a schematic sectional view illustrating an installation form of the microphone 201 according to another embodiment of the eighth embodiment of the invention. A tubular space 228 is present inside a case frame 227 and the microphone 201 is installed. A frame cover 229 in which a mesh-shaped ventilation portion (sound pressure input portion) 230 is installed is disposed in a sound entrance of the case frame 227. The case frame 227 may be an independent case frame or the case frame may be a part of the body of an automobile. A sound (sound pressure) acquired by the microphone 201 is input in a direction 1 illustrated in FIG. 17. The configuration illustrated in FIG. 17 is referred to as a microphone unit.

On the assumption of a case in which an automobile with the microphone unit illustrated in FIG. 17 is washed by a high-pressure washer, high-pressure water ejected from a nozzle of the high-pressure washer hit against the case frame 227 illustrated in FIG. 17, and therefore the water does not directly hit against the microphone 201. For example, even when water kicked up by a tire during traveling of the automobile infiltrates in a direction 1 illustrated in FIG. 17 and in the tubular space 228, the kicked-up water does not directly hit against the microphone 201 since the microphone 201 is not present on the axial line of the direction 1. Further, the water infiltrating into the tubular space 228 drains in a direction 2 illustrated in FIG. 17.

Here, the shape of the tubular space 228 inside the case frame 227 will be described.

The internal shape of the tubular space 228 is a substantial L shape, but an angle formed by the axial line (axis 1 in the drawing) of the frame cover 229 and a sound pressure acquisition direction (axis 2 in the drawing) of the microphone 201 is an angle which is not the right angle (90°) and is greater than 90°. The reason why the angle is greater than 90° is that it is easy for water to drain in a case in which water infiltrates into the vicinity of the microphone 201. When this angle is equal to or less than 90°, it is easy for water to stay in the vicinity of the microphone 201. Therefore, the angel formed by the axes 1 and 2 in the drawing is set to be greater than 90° in order to prevent water from staying. The angle formed by the axes 1 and 2 is preferably in the range from about 100° to about 160°. When the angle is set to be equal to or greater than 160°, there is a high possibility of the water directly hitting against the microphone 201, and thus the angle equal to or greater than 160° is not preferable.

As described above, by configuring the microphone to have the above-described unit configuration, it is possible to provide the form of the microphone which is disposed outside an automobile and is not broken down when the microphone is installed outside the automobile by protecting the microphone against high-pressure water ejected from a nozzle of a high-pressure washer, for example, when an automobile is washed. Further, when the microphone with the present form is installed, it is possible to provide the microphone unit satisfying protection levels of, for example, IPx6 (JIS C 0920: 2003, waterproof tests of electric machine appliances and protection levels against entrance of solids).

The microphone unit having the configuration can be applied not only to a microphone installed outside an automobile cabin but also an interphone microphone unit installed outside a house. In the case of the configuration, the microphone is not broken down even when a block wall or the like including an interphone is cleaned by a high-pressure washer. Therefore, it is possible to provide an interphone of which a use is not limited.

The microphone unit having the configuration can also be applied to a microphone unit for a kitchen device such as a gas range. Since oil slicks are attached to kitchen devices at the time of use, kitchen devices for business use are cleaned with high-pressure washers in many cases. Even in such cases, by applying the microphone having the configuration, it is possible to provide a kitchen device including the microphone in which a microphone body is not broken down and a durability performance is high.

(Ninth Embodiment)

Hereinafter, a ninth embodiment of the invention will be described in detail with reference to FIGS. 18(*a*), 18(*b*), and 19.

The embodiment provides a form of a microphone which is disposed outside an automobile and is not broken down when the microphone is installed outside the automobile by protecting the microphone against high-pressure water ejected from a nozzle of a high-pressure washer, for example, when an automobile is washed.

Figure 18A:
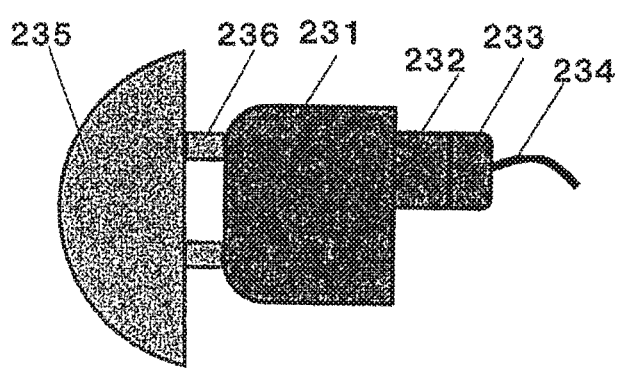
FIGS. 18(a) and 18(b) are schematic diagrams illustrating the structure of a microphone according to a ninth embodiment of the invention.
Figure 18B:
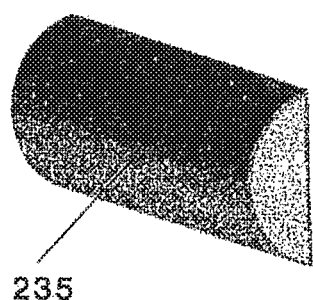

FIGS. 18(*a*) and 18(*b*) are schematic diagrams illustrating the structure of a microphone according to the ninth embodiment of the invention. FIG. 18(*a*) is a side view illustrating the outer appearance of the microphone when viewed in the horizontal direction. A microphone 231 includes a connector 232. The microphone 231 is electrically connected to the outside via the connector 232 by an external connector 233 and a wire cable 234. In the microphone 231, a front surface cover 235 is equipped and a connection component 236 connecting the front surface cover 235 to the microphone body is installed. FIG. 18(*b*) is a diagram illustrating the front surface cover 235 when viewed from the oblique front surface. In FIG. 18(*b*), the front surface cover 235 with a semi-cylindrical shape is illustrated, but the shape of the front surface cover is not particularly limited. The shape of the front surface cover may be any shape such as a circular shape, a dome shape, a trapezoidal shape, a square column shape, or a streamline shape and may be regulated so that the front surface of the microphone 231 is covered. In the front surface cover 235, a plurality of minute through holes may be formed. The front surface cover 235 may not necessarily be included directly in the microphone 231, but the front surface cover 235 may be mounted on another component/member. At this time, the connection component 236 illustrated in FIG. 18(*a*) is not necessary.

In the foregoing configuration, high-pressure water ejected from a nozzle of a high-pressure washer does not directly hit the microphone 231 when an automobile is washed. Therefore, it is possible to avoid breakdown of the microphone.

Figure 19:
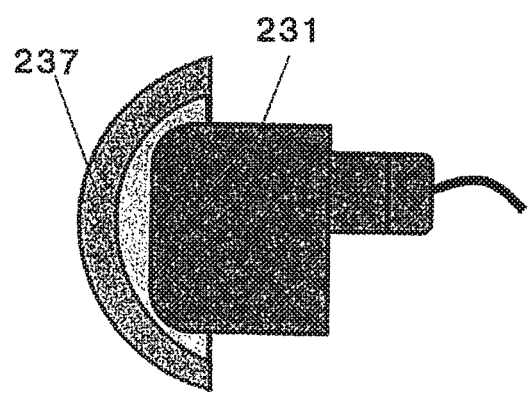
FIG. 19 is a schematic diagram illustrating the structure of another microphone according to the ninth embodiment of the invention.

FIG. 19 is a schematic diagram illustrating the structure of another microphone according to the ninth embodiment of the invention. FIG. 19 illustrates a state in which the inside of a front surface cover 237 is processed and thus is a sectional view illustrating the front surface cover 237. FIG. 19 is different from FIG. 18(*a*) in that the microphone 231 is covered with the front surface cover 237 and is hidden. Even in the front surface cover in the state illustrated in FIG. 19, the microphone can be protected from high-pressure water ejected from the nozzle of the high-pressure washer, as in FIG. 18(*a*).

(Tenth Embodiment)

Hereinafter, a tenth embodiment of the invention will be described in detail with reference to FIGS. 20(*a*) to 20(*c*).

The embodiment provides the microphone of the form different from that of the seventh embodiment.

Figure 20A:
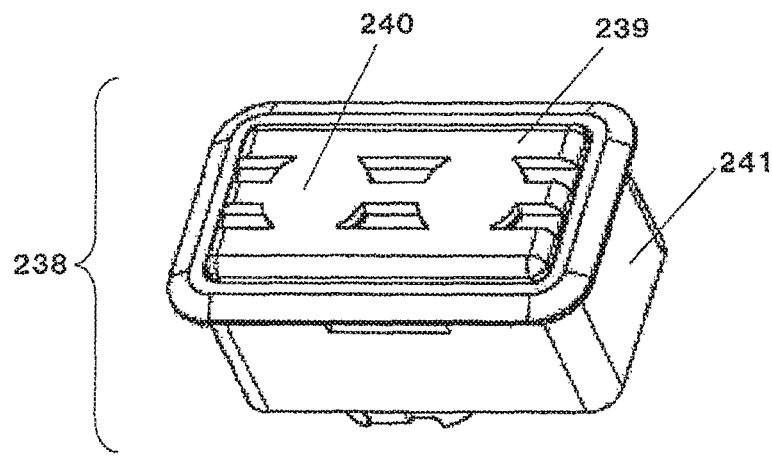
FIGS. 20(a) to 20(c) are schematic diagrams illustrating the structure of a microphone according to a tenth embodiment of the invention.
Figure 20B:
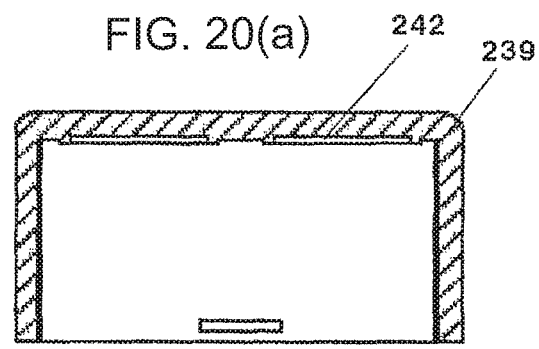
Figure 20C:
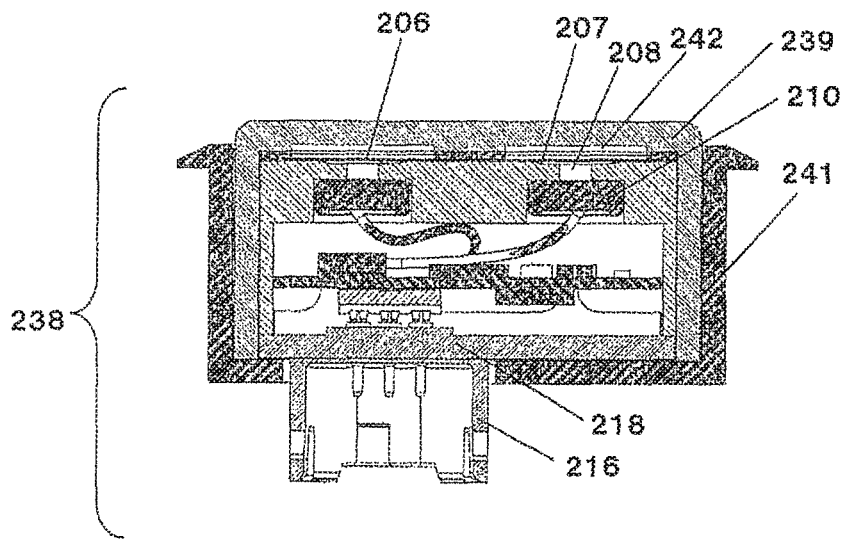

FIGS. 20(*a*) to 20(*c*) are schematic diagrams illustrating the structure of the microphone according to the tenth embodiment of the invention. FIG. 20(*a*) is a perspective view illustrating the outer appearance of the microphone, FIG. 20(b) is a sectional view illustrating a first case frame 239, and FIG. 20(c) is a sectional view illustrating the microphone.

The microphone illustrated in FIGS. 20(a) to 20(c) is different from the microphone illustrated in FIGS. 13(a) to 13(d) in the shape of a front surface of a first case frame.

The microphone in FIGS. 20(a) to 20(c) is different from the microphone 201 illustrated in FIGS. 13(a) to 13(d) in the shape of a case frame front surface portion 240 and presence of a space portion 242 in the first case frame 239. As in the microphone 201, for example, an acoustic transducer 210, an internal case having a conical counterbore 207 and a through hole 208, a second film membrane 206 installed on the internal case and preventing ingress of water or dirt into the inside, and a socket 218 including a connector 216 are disposed in the microphone 238. Although not illustrated, a groove serving as a drain for water removal may be formed in the first case frame 239. Although not illustrated, to prevent ingress of water or dirt into the inside of the microphone 238, resin sealing members are applied to connection portions between the first case frame 239 and the second case frame 241 and between the second case frame 241 and the connector 216. By assembling internal components of the microphone 238 without using the resin sealing members, subsequently integrating frames including the first case frame 239 and the second case frame 241, and performing resin molding, ingress of water or dirt into the microphone 238 may be prevented.

The case frame front surface portion 240 is disposed immediately above the acoustic transducer 210, the conical counterbore 207, and the through holes 208. The range of the case frame front surface portion 240 is greater than the range of the outer circumference dimensions of the acoustic transducer 210, the outer circumference dimensions of the conical counterbore 207, or the outer circumference dimensions of the through hole 208. The space portion 242 formed in the case frame is also disposed immediately above the acoustic transducer 210, the conical counterbore 207, and the through hole 208. The range of the space portion 242 is also greater than the range of the outer circumference dimensions of the acoustic transducer 210, the outer circumference dimensions of the conical counterbore 207, or the outer circumference dimensions of the through hole 208.

In the microphone of the foregoing form, even when high-pressure water is ejected at the time of high-pressure washing, the water is not directly ejected to the acoustic transducer, the film membrane on the conical counterbore, or the through hole formed immediately above the acoustic transducer, and thus the inside of the microphone is not broken down.

The embodiments of the invention have been described with reference to the detailed and specific embodiments, it should be apparent to those skilled in the art that various modifications or corrections can be made without departing from the spirit and essence of the invention, The embodiments of the invention are useful in a microphone disposed in a vehicle to collect a voice of a talker present outside the vehicle or detect a vehicle approaching the own vehicle.

What is claimed is:

1. A microphone that is disposed in a vehicle, the microphone comprising:
   a diaphragm;
   a frame of which an inside surface is one of a semispherical surface, a parabolic surface, or a conical surface;
   an acoustic transducer that converts sound pressure into an electric signal and includes a sound pressure input surface that receives the sound pressure to be converted into the electric signal; and
   a wire that transmits the electric signal from the acoustic transducer to an outside of the frame,
   wherein the sound pressure input surface of the acoustic transducer is disposed within the inside surface such that the sound pressure input surface is disposed on a bottom surface portion of the one of the semispherical surface, the parabolic surface, or the conical surface inside the frame, and
   wherein the diaphragm and the frame, and the frame and the wire are waterproofed to prevent ingress of water into the microphone.

2. The microphone according to claim 1,
   wherein in the diaphragm and the frame, and the frame and the wire, are coated with resins to prevent the ingress of the water into the microphone.

3. The microphone according to claim 1,
   wherein an O ring is disposed between the diaphragm and the frame to prevent the ingress of the water into the microphone.

4. The microphone according to claim 1,
   wherein a packing is disposed between the diaphragm and the frame to prevent the ingress of the water into the microphone.

5. A vehicle trunk opening and closing system comprising:
   the microphone according to claim 1, the microphone being configured to collect a voice spoken by a talker;
   a voice recognition device that uses a pre-decided specific spoken voice as a voice key;
   a signal processor that outputs an instruction signal to open or close a trunk of a vehicle according to information from the voice recognition device; and
   a lock that opens or closes the trunk of the vehicle.

6. The vehicle trunk opening and closing system according to claim 5,
   wherein a voice instruction to prompt a spoken voice input is given to the talker through a speaker.

7. A vehicle door opening and closing system comprising:
   the microphone according to claim 1, the microphone being configured to collect a voice spoken by a talker;
   a voice recognition device that uses a pre-decided specific spoken voice as a voice key;
   a signal processor that outputs an instruction signal to open or close a door of a vehicle according to information from the voice recognition device; and
   a lock that opens or closes the door of the vehicle.

8. The vehicle door opening and closing system according to claim 7,
   wherein a voice instruction to prompt a spoken voice input is given to the talker through a speaker.

9. A vehicle light illumination system comprising:
   the microphone according to claim 1, the microphone being configured to collect a voice spoken by a talker;
   a voice recognition device that uses a pre-decided specific spoken voice as a voice key; and
   a signal processor that outputs an instruction signal to turning on or off a light of a vehicle according to information from the voice recognition device.

10. The vehicle light illumination system according to claim 9,
    wherein a voice instruction to prompt a spoken voice input is given to the talker through a speaker.

11. A sound source direction estimation device for which a plurality of microphones are disposed in a first vehicle to detect a traveling sound of a second vehicle and which estimates a sound source direction of the second vehicle,
    wherein each of the plurality of microphones disposed in the first vehicle is the microphone according to claim 1.

12. A microphone that is disposed in a vehicle, the microphone comprising:
    a diaphragm;
    a frame of which an inside surface is one of a semispherical surface, a parabolic surface, or a conical surface;
    an acoustic transducer that converts sound pressure into an electric signal and includes a sound pressure input surface that receives the sound pressure to be converted into the electric signal; and
    a wire that transmits the electric signal from the acoustic transducer to an outside of the frame,
    wherein the sound pressure input surface of the acoustic transducer is disposed within the inside surface such that the sound pressure input surface is disposed to be opposite to a bottom surface portion of the one of the semispherical surface, the parabolic surface, or the conical surface inside the frame, and
    wherein the diaphragm and the frame, and the frame and the wire are waterproofed to prevent ingress of water into the microphone.

13. A microphone that is disposed in a vehicle, the microphone comprising:
    a diaphragm;
    a frame of which an inside surface is one of a semispherical surface, a parabolic surface, or a conical surface and in which a partition wall is disposed;
    a plurality of acoustic transducers that convert sound pressure into electric signals and include sound pressure input surfaces that receive the sound pressure to be converted into the electric signals; and
    a plurality of wires that transmit the electric signals from the plurality of acoustic transducers to an outside of the frame,
    wherein the sound pressure input surfaces of the plurality of acoustic transducers are disposed within the inside surface such that the sound pressure input surfaces are disposed on a bottom surface portion of the one of the semispherical surface, the parabolic surface, or the conical surface inside the frame with the partition wall inside the frame interposed therebetween to partition the sound pressure input surfaces, and
    wherein the diaphragm and the frame, and the frame and the plurality of wires are waterproofed to prevent ingress of water into the microphone.

\* \* \* \* \*